US008463245B2

(12) United States Patent
Bilange

(10) Patent No.: US 8,463,245 B2
(45) Date of Patent: Jun. 11, 2013

(54) SYSTEMS AND METHODS FOR COMMUNICATING MUSIC INDICIA

(75) Inventor: Eric Bilange, San Diego, CA (US)

(73) Assignee: Shoreline Innovations, LLC, Redwood City, CA (US)

(\*) Notice: Subject to any disclaimer, the term of this patent is extended or adjusted under 35 U.S.C. 154(b) by 759 days.

(21) Appl. No.: 11/396,323

(22) Filed: Mar. 30, 2006

(65) Prior Publication Data

US 2007/0232223 A1    Oct. 4, 2007

(51) Int. Cl.
*H04M 3/42* (2006.01)

(52) U.S. Cl.
USPC .............. 455/414.1; 455/414.2; 455/414.3; 455/414.4; 705/5

(58) Field of Classification Search
USPC ................. 455/414.1–414.4; 705/5
See application file for complete search history.

(56) References Cited

U.S. PATENT DOCUMENTS

| | | |
|---|---|---|
| 2001/0047428 A1 | 11/2001 | Hunter |
| 2002/0065944 A1 | 5/2002 | Hickey et al. |
| 2002/0113819 A1 | 8/2002 | Baer et al. |
| 2002/0154691 A1 | 10/2002 | Kost et al. |
| 2002/0154759 A1* | 10/2002 | Ishii ........................ 379/373.01 |
| 2002/0191031 A1 | 12/2002 | Ricard |
| 2003/0051209 A1 | 3/2003 | Androski et al. |
| 2003/0074660 A1 | 4/2003 | McCormack et al. |
| 2003/0217328 A1 | 11/2003 | Agassi et al. |
| 2004/0093595 A1 | 5/2004 | Bilange |
| 2004/0133848 A1 | 7/2004 | Hunt et al. |
| 2004/0148576 A1 | 7/2004 | Matveyenko et al. |
| 2004/0199543 A1 | 10/2004 | Braud et al. |
| 2005/0055309 A1 | 3/2005 | Williams et al. |
| 2005/0096018 A1* | 5/2005 | White et al. ............... 455/414.1 |
| 2005/0144251 A1* | 6/2005 | Slate ............................ 709/215 |
| 2005/0155484 A1* | 7/2005 | Yanase et al. .................. 84/615 |
| 2005/0188298 A1 | 8/2005 | Makela |
| 2005/0192953 A1 | 9/2005 | Neale et al. |
| 2005/0193053 A1 | 9/2005 | Kendall et al. |
| 2005/0202385 A1* | 9/2005 | Coward et al. ............ 434/307 R |
| 2005/0245246 A1 | 11/2005 | Munch et al. |
| 2006/0031257 A1* | 2/2006 | Lipscomb et al. ......... 707/104.1 |
| 2007/0083762 A1* | 4/2007 | Martinez ....................... 713/176 |
| 2007/0116236 A1* | 5/2007 | Kargman et al. ........ 379/221.11 |

OTHER PUBLICATIONS

Bilange, 2005, "Multiplayer Wireless Games," Sun Microsystems JavaOne, 2005 JavaOne Conference, Session 1398: 2-41.
Day, 2001, "Developing Wireless Applications using the Java™ 2 Platform, Micro Edition," Sun Microsystems, Inc.

(Continued)

*Primary Examiner* — Kamran Afshar
*Assistant Examiner* — Shahriar Behnamian

(57) ABSTRACT

Systems and methods for providing a menu permanently stored on a mobile device. The menu provides a ranked music indicia option to review a ranked list of music indicia over a cellular network. The menu further provides a news and reviews option to review news and reviews relating to a music artist or a band over a cellular network. The menu further provides an artist option to obtain information about a music artist or a band over a cellular network. An application provisioning server comprising instructions for (i) receiving a selection over a cellular network and (ii) providing over a cellular network, as a function of said selection, any of (a) a ranked list of music indicia, (b) news and reviews relating to a music artist or band or (c) information about a music artist or a band.

43 Claims, 18 Drawing Sheets

OTHER PUBLICATIONS

"Connected Limited Device Configuration (CLDC); JSR 30, JSR 139 Overview," Feb. 8, 2006, http://java.sun.com/products/cldc/overview.html.

"Java Technology for the Wireless Industry (JTWI); JSR 185 Overview," Feb. 8, 2006, http://java.sun.com/products/jtwi/overview.html.

"Mobile Information Device Profile (MIDP); JSR 37, JSR 118 Overview," Feb. 8, 2006; http://java.sun.com/products/midp/overview.html.

"J2ME FAQs," Feb. 8, 2006 http://java.sun.com/j2me/reference/faqs/faqs_j2me.html.

Giguère, 2006, "The Importance of the Mobile Information Device Profile (MIDP)," http://www.developer.com/ws/j2me/article.php/1453731.

Giguère, 2006, "The Connected Limited Device Configuration (CLDC)," http://www.developer.com/ws/j2me/artiele.php/1436051.

Holma et al., 2000, "WCDMA for UMTS Radio Access for Third Generation Mobile Communications," John Wiley & Sons, Inc.

Hauttecoeur, 2003, "Age-related adapted ubiquitous computing," KomIt.

Horozov et al., "MOBY—A Mobile Peer-to-Peer Service and Data Network," International Conference on Parallel Processing, Proceedings,. Aug. 18-21, 2002, pp. 437-444.

Landis et al., 2002, "Reaching out to the Cell Phone with Jini," Proceedings of the 35$^{th}$ Hawaii International Conference on System Sciences.

Marks et al., 2005, "Advanced MIDP Programming: Creating Custom User Interface Components," Sun Microsystems 2005 JavaOne Conference, Session 3221 (Presentation).

"Network Switching Subsystem," Network Switching Subsystem—Wikipedia, the free encyclopedia, Feb. 15, 2006 http://en.wikipedia.org/wiki/Mobile_Switching_Center.

Pliss et al., 2005, "Unleashing the Performance of the Advanced Java™ ME," Sun Microsystems 2005 JavaOne Conference, Session TS 3401 (Presentation): 1-8.

Raento et al., Apr.-Jun. 2005, "ContextPhone: A Prototyping Platform for Context-Aware Mobile Applications," Pervasive computing: 51-59.

Seshadri et al., 2004, "SWATT: SoftWare-based ATTestation for Embedded Devices," 2004 IEEE Symposium on Security and Privacy: 1-9.

Sun Microsystems, 2003, "The Complexity of Developing Mobile Networked Data Services," Java 2 Platform, Micro Edition (J2ME™) Wireless Connection Wizard for Sun™ ONE Studio Software Jun. 2003: 1-13.

Sun Microsystems, 2006, "Java™ Technology for the Wireless Industry (JTWI)," Datasheet Java Technology for the Wireless Industry (JTWI): 1-2.

Sun Microsystems, 2006, "Mobile Information Device Profile," Datasheet Mobile Information Device Profile: 1-2.

Sun Microsystems, 2002, "The CLDC Hotspot™ Implementation Virtual Machine," Java™ 2 Platform, Micro Edition (J2ME™).

"Wireless Application Protocol," Feb. 9, 2006, Wireless Application Protocol—Wikipedia, the free encyclopedia, http://en.wikipedia.org/wiki/Wap.

Wolter et al., 2005, "Developing Mobile Applications that Utilize Web Services—A Sprint Case Study," Sun's 2005 Worldwide Java Developer Conference, Session TS-1429: 2-54.

* cited by examiner

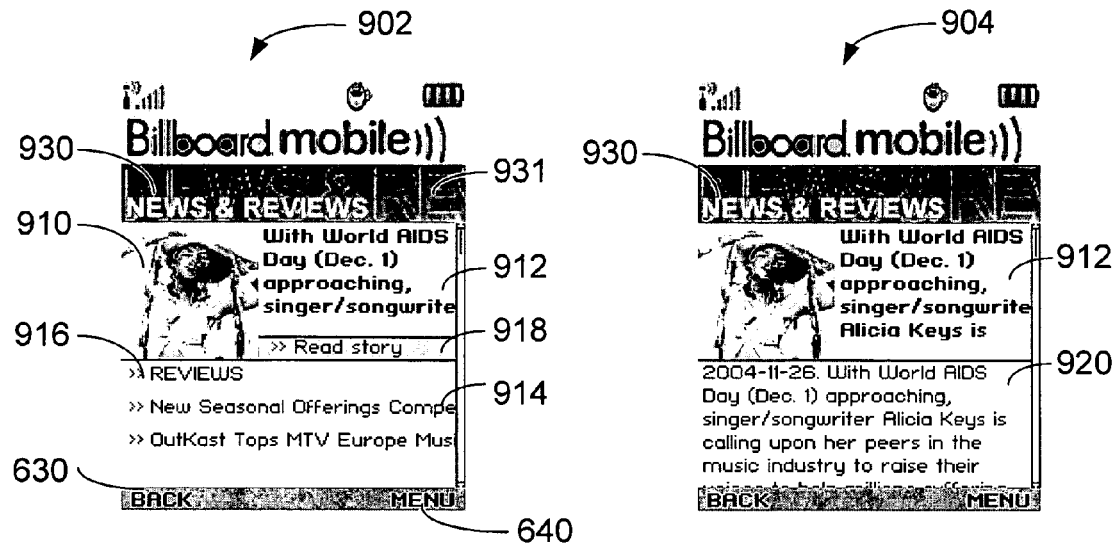
Fig. 9A
Fig. 9B
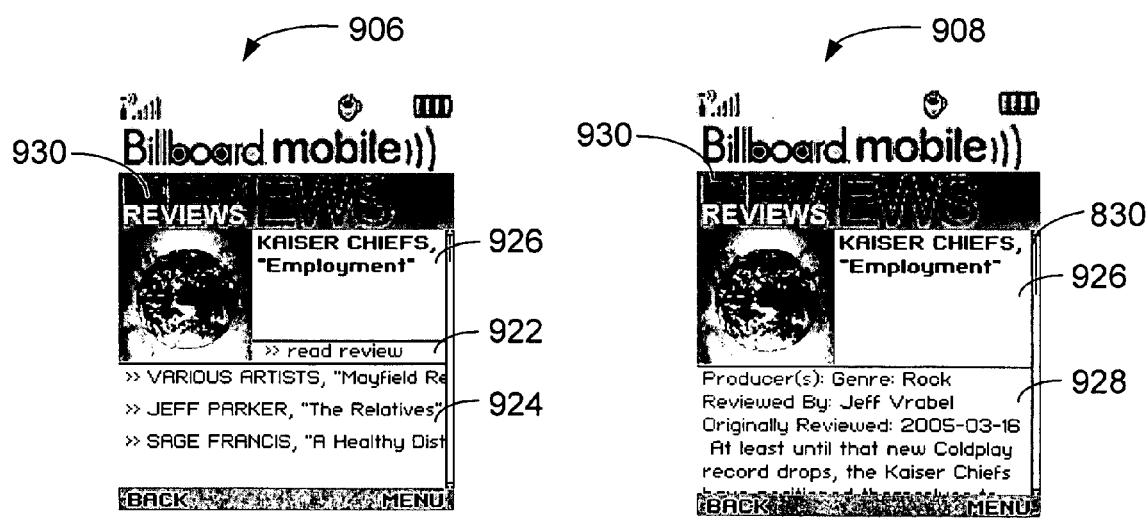
Fig. 9C
Fig. 9D

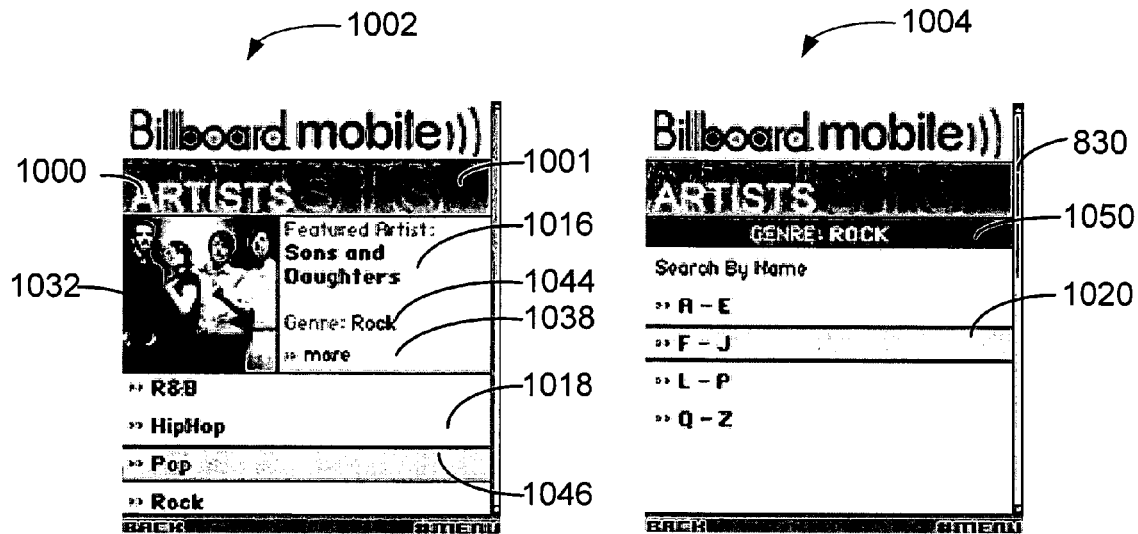
Fig. 10A
Fig. 10B
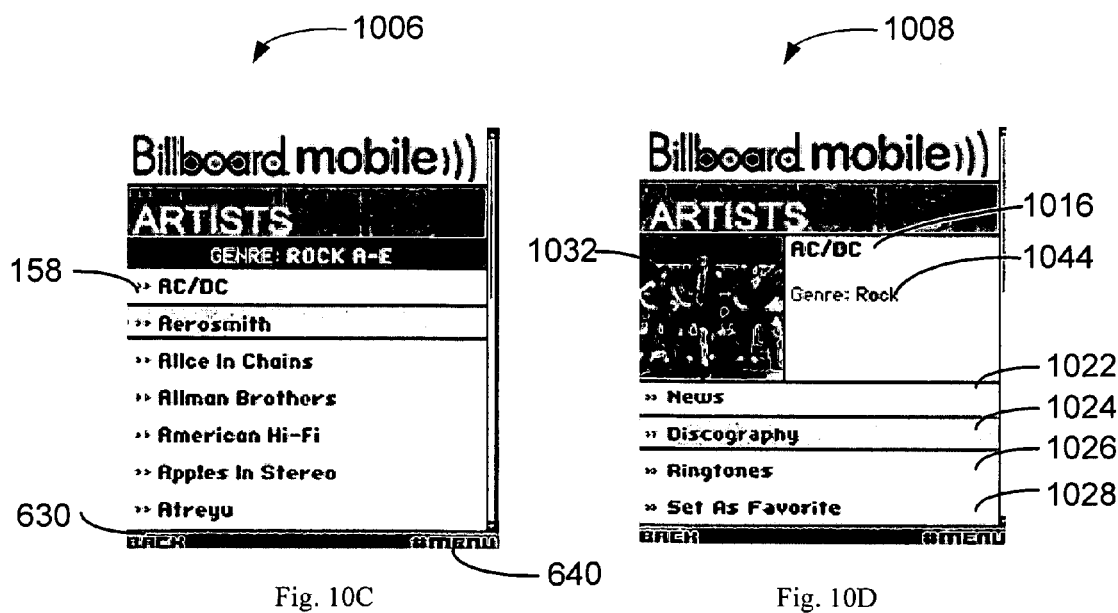
Fig. 10C
Fig. 10D

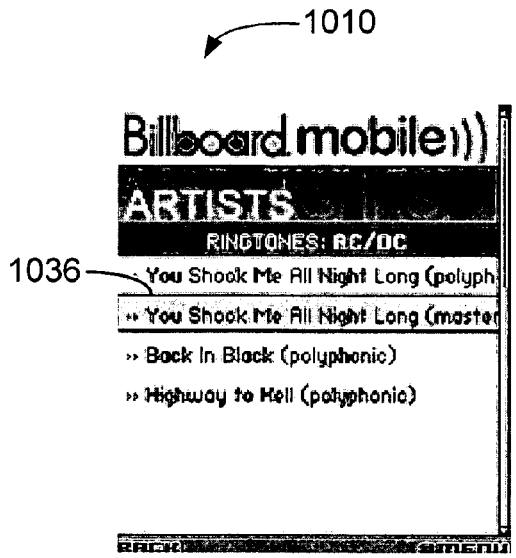
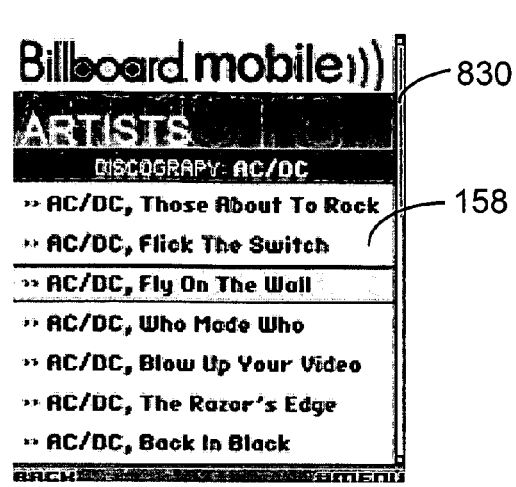
Fig. 10E
Fig. 10F
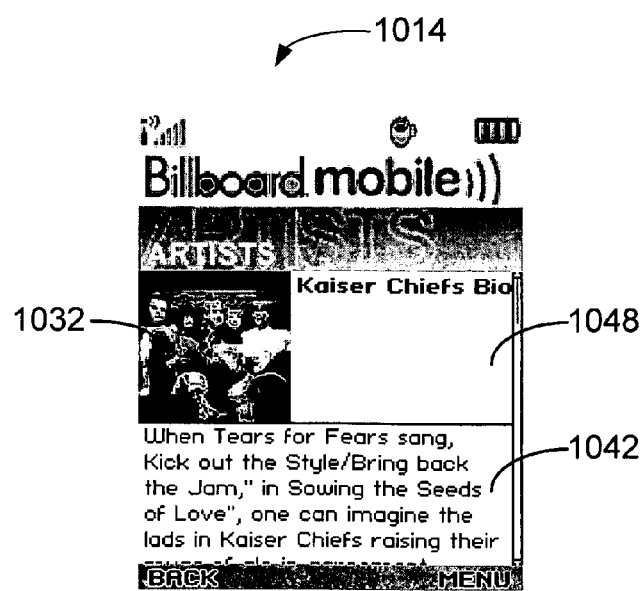
Fig. 10G

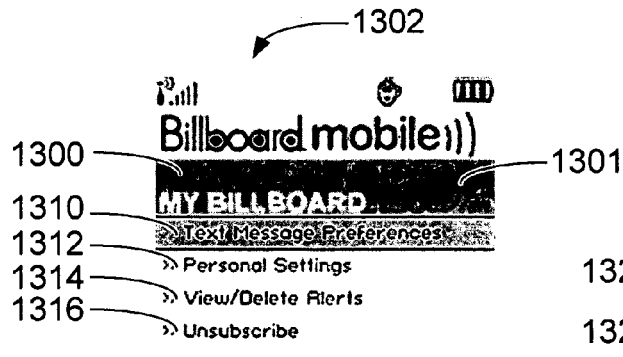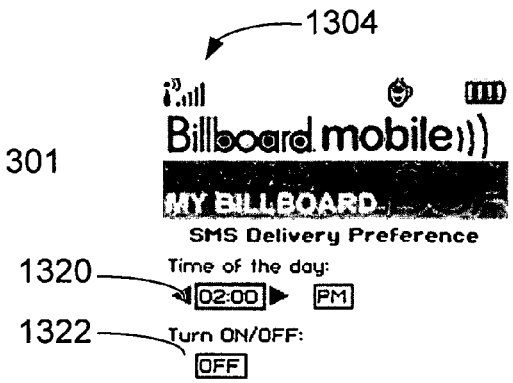
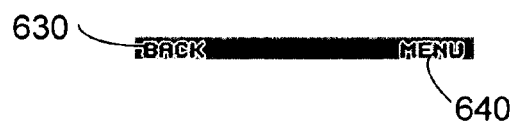
Fig. 13A
Fig. 13B
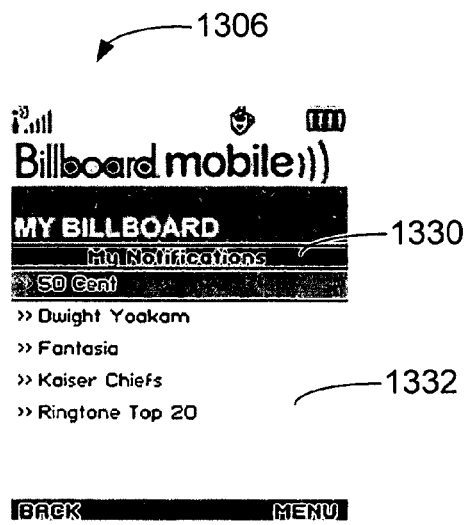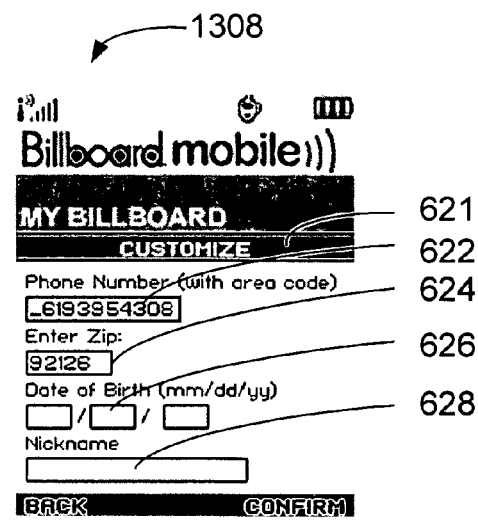
Fig. 13C
Fig. 13D

SYSTEMS AND METHODS FOR COMMUNICATING MUSIC INDICIA

1. FIELD OF THE INVENTION

The present invention relates to wireless communication systems and methods. More particularly, the systems and methods of the present invention provide ranked music indicia and ringtones to mobile device users.

2. BACKGROUND OF THE INVENTION

The development of the Internet has made it possible for users to access large amounts of information by using browsers on computer systems. Collective information on a specific topic for example, music, entertainment, sports and finance, has been available through Internet portal sites such as Yahoo! music and dedicated websites such as Billboard.

Websites such as Yahoo! music provide comprehensive information on entertainment news and shows. These sites allow users to search and download music, graphic, and video files (e.g., 200 in FIG. 2A). A typical web page at Yahoo! music provides users with the option of listening to music on an Internet radio station (e.g., 208 in FIG. 2A) and, by the Y! music unlimited web-based program (e.g., 204 in FIG. 2A), previewing music video through a music video preview program (e.g., 206 in FIG. 2A) Such web sites also provide access to news and information about artists and bands (e.g., 202 in FIG. 2A). The Yahoo! music site also provides each user with a personalized default home page that can be customized by the user so that the page displays specific information about favorite artists or genres of artists as well as other preferred content.

Users may also access specific music information through websites that specialize in music and entertainment. FIG. 2B illustrates a website at Billboard.com hosted by the Billboard Information Group (New York). The site offers news, features, columns and reviews through News & Review toggle 214. Billboard periodically provides charts of United States entertainment sales, music airplay, music downloads and box office grosses through Chart toggle 212. Access to artist related information is provided by Artists toggle 216, online music shopping is provided by Shop toggle 218, music business development related information is provided by Biz Tools toggle 220, entertainment related information is provided by Entertainment toggle 222, and Interact toggle 224 provides an interactive interface where users may ask their own music-related questions or participate in online polls.

Websites such as the one depicted in FIG. 2 advantageously provide users with comprehensive entertainment services. However, such websites have the drawback that they are only available on networked computers. Thus, the information provided by such websites is not available to users who desire such information but do not have ready access to a networked computer. Systems and methods are needed in the art to provide information or tools that make information more readily available to users who do not have access to a networked computer.

In the art, attempts have been made to provide such information using devices that communicate using cellular networks. Devices that communicate using cellular networks include cell phones and personal digital assistants (PDAs). Users of mobile devices can access the Internet through specialized web browsers that communicate over a cellular network. However, there are substantial differences between networked computers (e.g., desktop and lap top computers) and mobile devices such as cell phones because each has quite different requirements to serve different needs. The mobile device screen must be able to tolerate scratching, being dropped, moisture, cold weather, and other problems while at the same time consuming very little power. The networked computer screen doesn't have these limitations, so it can be bigger and show better graphics. Other important differences are the input mechanisms. The networked computer typically has a keyboard with over 80 keys as well as a mouse, and the user can easily use both hands to enter data or control the system. With mobile devices in general, input mechanisms are more limited. Typically, the number of keys in the input mechanism is limited (e.g., 0 to 9, arrow keys, and some additional control keys). Typing text for memos with these few keys is laborious. Mobile device screen sizes and input keys are best when used for simple actions such as browsing menus or small pages. There is also a significant difference in download times between networked computers and mobile devices. A picture, which looks good and downloads fast on a networked computer, doesn't fit the screen and takes a long time to download on a mobile device such as a cell phone. Consequently, efforts to provide music information using mobile devices have been, to date, unsatisfactory.

The 3 Gupload website 230 of FIG. 2C provides a solution that attempts to overcome the limited bandwidth of mobile devices. The web site allows users to download selected files including cell phone games and ringtones onto their mobile devices. First, a user signs up for an account over the Internet at the www.3Gupload.com website using a networked computer. The user then browses collections of games, screen savers, ringtones (e.g., 234 in FIG. 2C), and applications provided by the 3 Gupload website. Selected files and applications are put into a virtual locker on a remote server using My Locker toggle 232. The user then launches a web browser on a mobile device, logs into the virtual locker, and downloads the selected files and applications onto the mobile device. Although the methods used by 3 Gupload.com allows a user to effectively collect files into the same destination, e.g., a web locker, for subsequent download onto a mobile device, the approach still requires a networked computer each time a download is made. For users who do not have access to networked computers, the 3 Gupload method is impractical.

Given the above background, it is apparent that what are needed in the art are improved systems and methods for providing entertainment related services to end users who have mobile devices.

Discussion or citation of a reference herein will not be construed as an admission that such reference is prior art to the present invention.

3. SUMMARY OF THE INVENTION

The present invention provides systems and methods for providing entertainment related services on mobile devices. In one embodiment a menu in a program permanently stored on a mobile device, such as a cell phone or personal digital assistant, is executed. Then a first module from the menu is selected thereby providing access to a catalog of music items. The user makes a selection of a music item from the catalog. The music item is then retrieved from a remote server. In some embodiments, the menu comprises a plurality of modules where at least one module in the plurality of modules provides a link to ranked music indicia.

One aspect of the present invention provides a computer program product for use in conjunction with a mobile device. The computer program product comprises a computer readable storage medium and a computer program mechanism embedded therein. The computer program mechanism comprises instructions for executing a menu having several options. One option is a ranked music indicia option to review a ranked list of music indicia over a cellular network. Another option is a news and reviews option to review news and reviews relating to a music artist or a band over a cellular network. Yet another option is an artist option to obtain information about a music artist or a band over a cellular network. The menu is permanently stored in the mobile device. In some embodiments, the ranked music indicia option, the news and reviews option, and the artist option each directly link or indirectly link to a music store over a cellular network where a music item can be purchased.

In some embodiments the computer program mechanism further comprises instructions for obtaining a message over a cellular network when the music item is purchased. The message can be, for example, a short message service (SMS) communication, an enhanced messaging system (EMS) communication, a multi-media messaging service (MMS) communication, an instant message, or an e-mail. In some embodiments, the message conveys a charge for the music item when the music item is permanently stored in the mobile device. In some embodiments, computer program mechanism further comprises instructions for (i) permanently storing a music item received over a cellular network in the mobile device, or (ii) sampling a music item received over a cellular network without permanent storage in the mobile device.

In some embodiments, the mobile device is a cell phone or personal digital assistant. In some embodiments, the cellular network used by the ranked music indicia option, the news and reviews option, or the artist option implements a 2 G or 3 G protocol. In some embodiments, the ranked list of music indicia comprises a ranked list of songs, a ranked list of albums, or a ranked list of ringtones. In some embodiments, the news and reviews option comprises instructions for providing music related news and reviews as a function of user directed input that includes a designated venue, an artist, a band, an orchestra, a genre, a zip code, a band, or an album identity. In some embodiments, the news and reviews concerns a venue, an artist, a band, an orchestra, a genre, a zip code, or an album. In some embodiments, the information about an artist or a band comprises: the discography of the artist or band, news and/or a review of the artist or band. In some embodiments, the information about an artist or a band comprises a biography of the artist or the band. In some embodiments, the information about an artist or a band comprises a ranked ringtone list of the artist or the band. In some embodiments, the artist option comprises instructions for providing information about an artist or a band as a function of user directed input that includes an artist, a band, an orchestra, or a genre.

In some aspects of the invention, the menu further comprises a music related events option to obtain information about a plurality of music related events in a geographical area. The music related event can be, for example, a concert performed by an artist or a band. In some embodiments, the music related event in the plurality of music related events takes place in a designated venue such as a city, town, village, county, building, or state. In some embodiments, the music related events option comprises instructions for identifying the music related event as a function of user directed input that includes a designated venue, an artist, or a zip code.

In some aspects of the invention, the menu further comprises a games option that provides access to a game over a cellular network. The game can be, for example, a music-related trivia game. In some aspects of the invention, the menu further comprises a personalization option that facilitates creation of a user profile that individualizes a plurality of user specified preferences. In some embodiments, a user specified preference in the plurality of user specified preferences is a setting for message delivery and/or a default ringtone specification.

In some embodiments, the computer program mechanism further comprises instructions for executing a verification process prior to executing the menu. This verification process can comprise, for example, communicating a license code or password over a cellular network prior to executing the menu. In some embodiments the ranked list of music indicia comprises Ringtone Top 20, R&B/HipHop Top 20, Rock Top 20, Pop Top 20, Latin Top 20, Country Top 20, or Rap Top 20. In some embodiments, the ranked music indicia comprises ringtones ranked by a number of downloads in a predetermined time period. In some embodiments, the predetermined time period is a minute, an hour, a day, a week, a month, or a year.

Still another aspect of the present invention provides an application provisioning server comprising a central processing unit and a memory, coupled to the central processing unit. The memory comprises instructions for (i) receiving a selection over a cellular network and (ii) providing over a cellular network, as a function of the selection, any of (a) a ranked list of music indicia, (b) news and reviews relating to a music artist or band, or (c) information about a music artist or a band. In some embodiments, the ranked list of music indicia comprises a ranked list of songs, albums, or ringtones. In some embodiments, the ranked list of music indicia comprises Ringtone Top 20, R&B/HipHop Top 20, Rock Top 20, Pop Top 20, Latin Top 20, Country Top 20, or Rap Top 20. In some embodiments, the ranked music indicia comprises ringtones ranked by a number of downloads in a predetermined time period (e.g., a minute, an hour, a day, a week, a month, or a year).

Yet another aspect of the present invention provides a computer program product for use in conjunction with a computer. The computer program product comprises a computer readable storage medium and a computer program mechanism embedded therein. The computer program mechanism comprises instructions for (i) receiving a selection over a cellular network and (ii) providing over a cellular network, as a function of said selection, any of (a) a ranked list of music indicia, (b) news and reviews relating to a music artist or band, (c) information about a music artist or a band. In some embodiments, the ranked list of music indicia comprises a ranked list of songs, albums, or ringtones. In some embodiments, the ranked list of music indicia comprises Ringtone Top 20, R&B/HipHop Top 20, Rock Top 20, Pop Top 20, Latin Top 20, Country Top 20, or Rap Top 20. In some embodiments, the ranked music indicia comprises ringtones ranked by a number of downloads in a predetermined time period. In some embodiments, the predetermined time period is a minute, an hour, a day, a week, a month, or a year.

4. BRIEF DESCRIPTION OF THE DRAWINGS

FIG. 9A illustrates a front page in a news and reviews module in accordance with an embodiment of the present invention.

FIG. 9B illustrates a full length feature headline in accordance with an embodiment of the present invention.

FIG. 9C illustrates a review page in accordance with an embodiment of the present invention.

FIG. 9D illustrates a full length selected review in accordance with one embodiment of the present invention.

FIG. 10A illustrates a front page of an Artist module in accordance with an embodiment of the present invention.

FIG. 10B illustrates an artist genre page in accordance with an embodiment of the present invention.

FIG. 10C illustrates an exemplary artist list page in accordance with one embodiment of the present invention.

FIG. 10D illustrates an exemplary artist page in accordance with one embodiment of the present invention.

FIG. 10E illustrates a ringtone page in accordance with one embodiment of the present invention.

FIG. 10F illustrates an exemplary artist page in accordance with one embodiment of the present invention.

FIG. 10G illustrates an exemplary artist news page in accordance with one embodiment of the present invention.

FIG. 13A illustrates the top page of a My Billboard module that allows users to manage user preferences in accordance with an embodiment of the present invention.

FIG. 13B illustrates SMS delivery preference options in accordance with an embodiment of the present invention.

FIG. 13C illustrates notification preference options in accordance with an embodiment of the present invention.

FIG. 13D illustrates customization preference options in accordance with an embodiment of the present invention.

Like reference numerals refer to corresponding parts throughout the several views of the drawings.

5. DETAILED DESCRIPTION

The present invention provides systems and methods for communicating information between mobile devices 12 (FIG. 1) and an application provisioning server 100. More specifically, the present invention provides systems and methods for receiving one or more music items, e.g. ringtones, full track songs, etc., from application provisioning server 100 on mobile devices 12. In some embodiments in accordance with the present invention, the music items are received in response to an electronic request, such as a short message service (SMS) communication. In other embodiments, the request may be communicated via a multi-media messaging service (MMS) communication, an enhanced messaging system (EMS) communication, or a short messaging (SM) communication, an instant messaging (IM) communication, or an extended simple mail transfer protocol (ESMTP) message. Such communication formats are described in Longueuil, 2001, *Wireless Messaging Demystified: SMS, EMS, MMS, IM, and Others*, first edition, McGraw-Hill Professional, New York, which is hereby incorporated herein by reference in its entirety. See also Le Bodic, 2003, *Mobile Messaging Technologies and Services: SMS, EMS and MMS*, John Wiley & Sons, New York; Asia Pacific Telecom, 2001, *Mobile Short Message Service: An article from Asia Pacific Telecom*, August Newsletter 5(8):19, Information Gatekeepers, Inc.; Le Bodic, 2003, *Multimedia Messaging Service: An Engineering Approach to MMS*, John Wiley & Sons, New York; Dreamtech Software Team, 2002, Instant Messaging Systems: Cracking the Code, Wiley Publishing Inc., New York; and Hughes, 1998, *Internet E-mail: Protocols, Standards, and Implementation*, Artech House Publishers, each of which is hereby incorporated herein by reference in its entirety.

5.1 System Architecture and Overview

Figure 1:
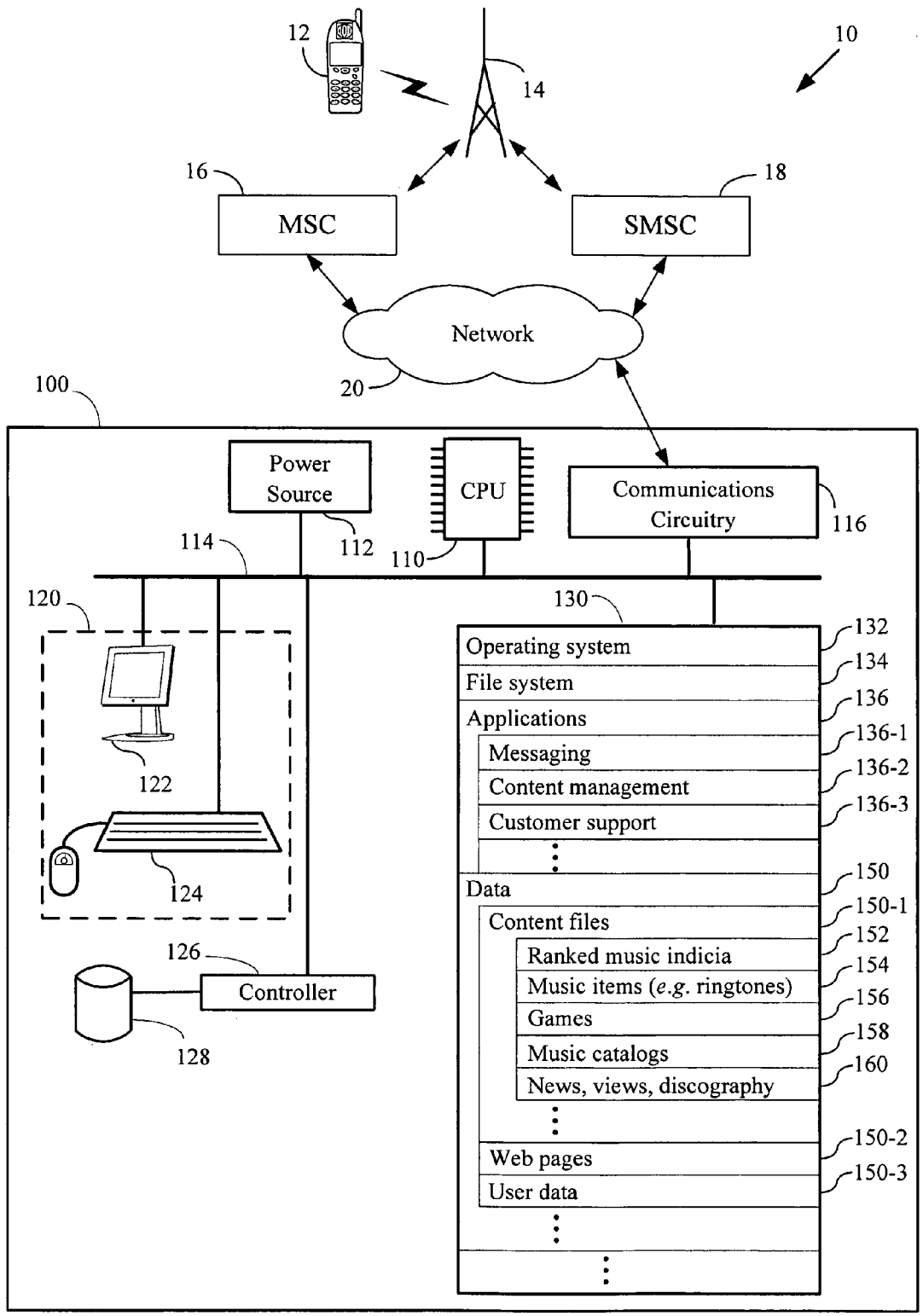
FIG. 1 illustrates a computer system in accordance with one embodiment of the present invention.
Figure 2A:
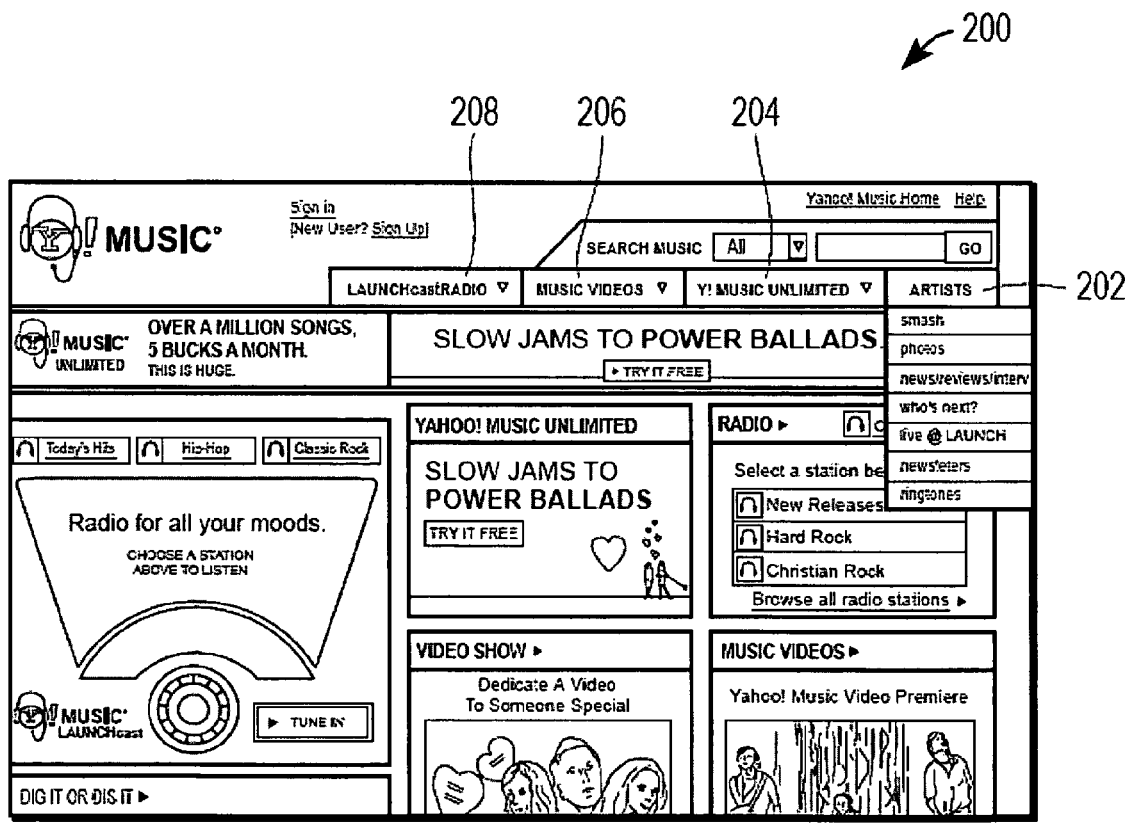
FIG. 2A illustrates a website in accordance with prior art.
Figure 2B:
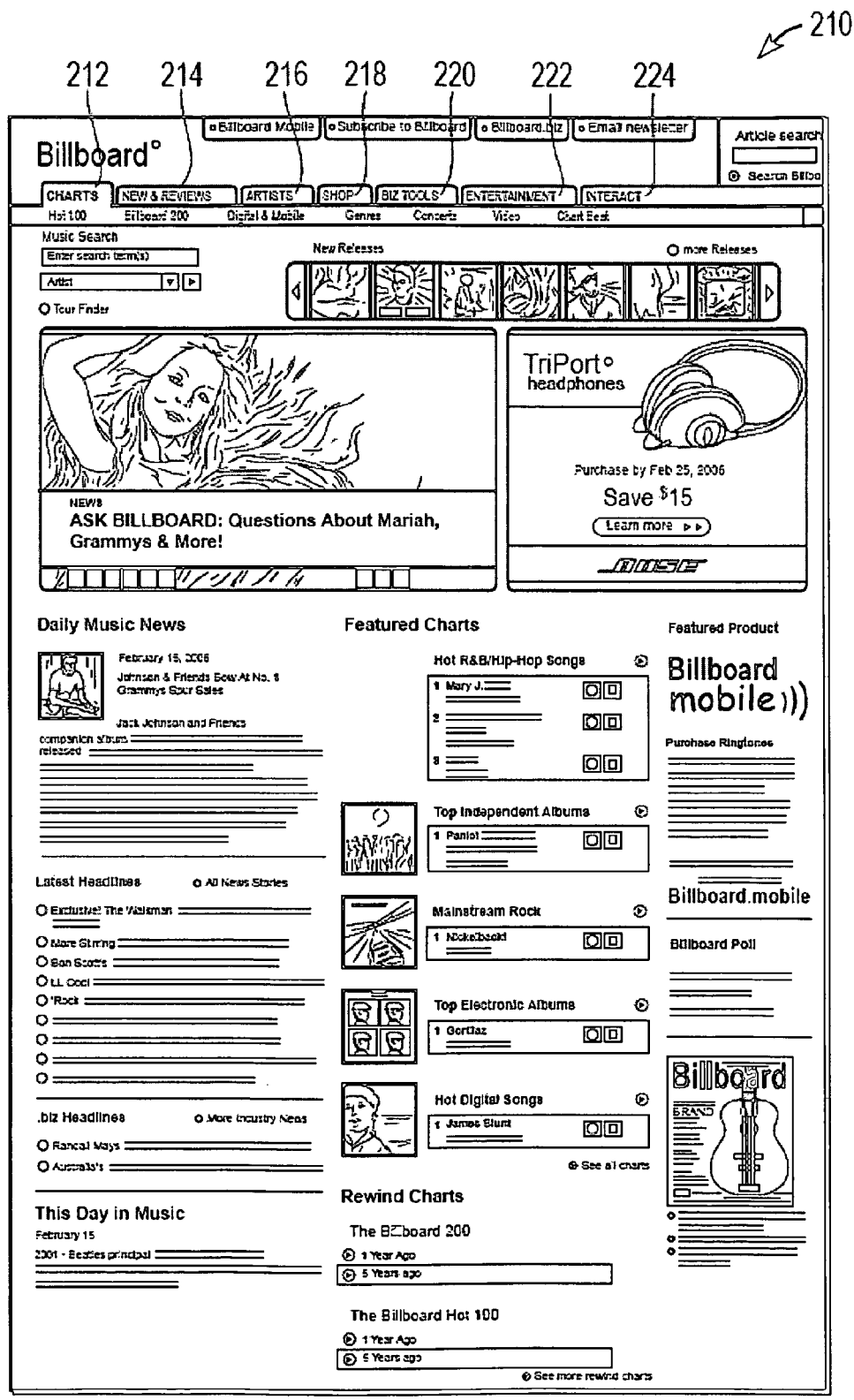
FIG. 2B illustrates a website in accordance with prior art.
Figure 2C:
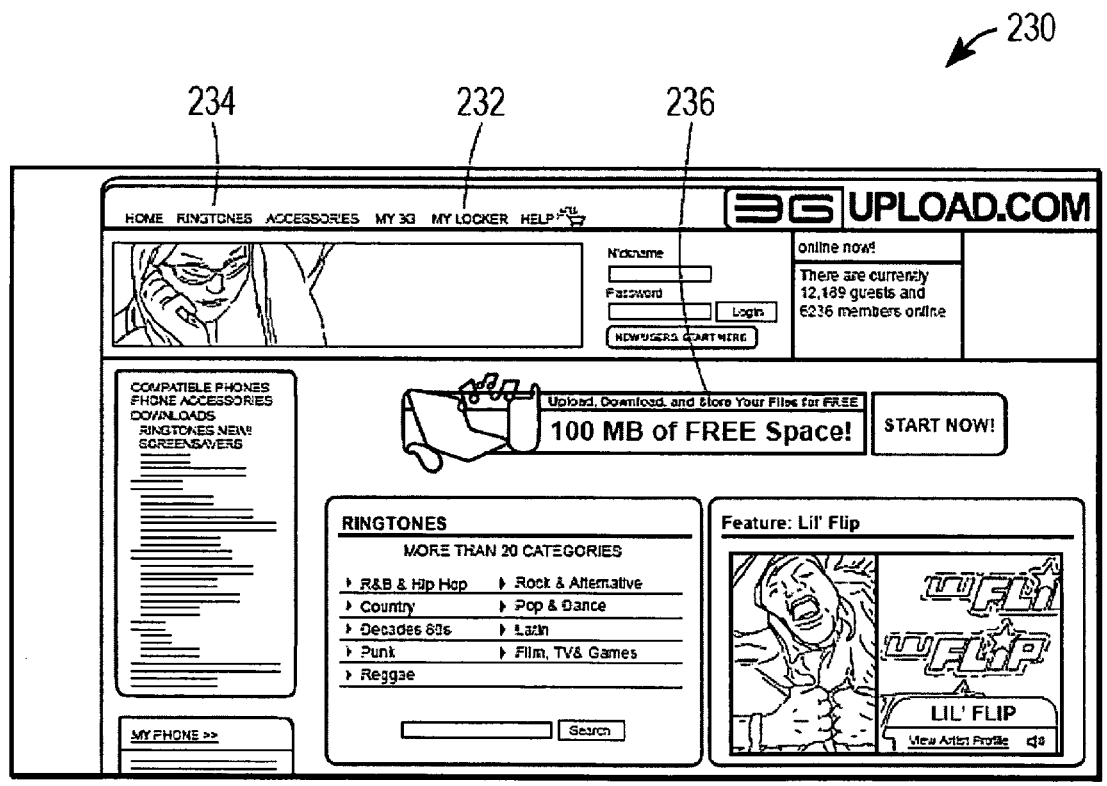
FIG. 2C illustrates a website in accordance with prior art.

FIG. 1 details an exemplary system 10 that supports the functionality described above and detailed in sections below. System 10 comprises a mobile device 12, an application provisioning server 100, and a method for communicating information between mobile device 12 and application provisioning server 100 with mobile devices 12 through wireless communication across network 20. Network 20 can comprise one or more wireless networks described in more detail below. Mobile device 12 is, at times, in cellular communication with application provisioning server 100 via a base station 14 to a mobile switching center (MSC) 16 for voice communications and/or a short message service center (SMSC) 18 for sending and receiving short messages, for example through a network 20.

5.1.1 Provisioning Server System

In some embodiments, application provisioning server 100 comprises a central processing unit 110, a user interface 120, communications circuitry 116, volatile memory 130, non-volatile memory 128, and a bus 114 to connect the aforementioned components. Application provisioning server 100 further includes a power source 112 to power the aforementioned components. Memory 130 may comprise random-access memory (RAM), read-only memory (ROM), flash memory and the like. In some embodiments, memory 130 comprises high-speed RAM for storing system control programs, data, and application programs, e.g., programs and data loaded from non-volatile storage 128 via controller 126. In some embodiments user interface 120 comprises one or more input devices 124, e.g., keyboard, key pad, mouse, scroll wheel, and the like, and a display 122 or other output device. Network interface card or other communication circuitry 116 provides for connection to any wired or wireless communications network 20, which may include the Internet and/or any other wide area network, and in particular embodiments comprises a telephone network such as a mobile telephone network.

Operation of application provisioning server 100 is controlled primarily by operating system 132. Operating system 132 can be stored in system memory 130. In addition to operating system 132, in a typical implementation system memory 130 includes a file system 134 for controlling access to the various files and data structures used by the present invention, one or more application modules 136, and one or more databases or data modules 150.

Application modules 136 may comprise one or more of the following:
- messaging application 136-1 for sending and receiving data 150 using, e.g., using SMS, PSMS, EMS, MMS, instant messages, e-mail messages, and/or other types of electronic messages;
- a content management application 136-2 for formatting and scheduling data 150 to be delivered to a user;
- a customer support application 136-3 for enabling a customer support agent to assist users with information or questions regarding their account, technical support, billing, etc. Application 136-3 may include an interactive voice response IVR system for facilitating interactions with a user calling via telephone system, for example by providing the user with a menu of customer support options and responding to the selections or commands made by the user.

The one or more data modules 150 may include any number of data structures or files, for example, content files 150-1, such as ranked list of music indicia 152 (e.g., charts), music items (e.g., audio files such as songs, ringtones, etc.) 154, games 156, music catalogs 158, news, views, and discography etc. 160 to be delivered to subscribers or users of system 10.

In some embodiments, data 150 is transferred from application provisioning server 100 to mobile device 12. In some embodiments, data 150 is edited or modified by content management application 136-2 so that the data is suitable for the specifications of a particular mobile device 12. For example, the present invention supports a large variety of mobile devices 12 with different specifications including screen resolution, memory resources, and processor speed. Content management module 136-2 optimizes content files 150-1 in accordance with the hardware specifications of each of mobile device 12 supported by application provisioning server 100. In some embodiments, mobile device 12 sends a message to application provisioning server 100 to report the specifications of mobile device 12. The information that will be communicated accordingly to mobile device 12 will reflect those specifications. The method used to report the specifications of mobile devices 12 can be one or applications that are run on such mobile devices 12 (e.g., application 336 of FIG. 3), or one or more non-native applications (e.g., music module 380 of FIG. 3), or a combination thereof.

In some embodiments, each of the aforementioned data structures stored or accessible to application provisioning server 100 are single data structures. In other embodiments, any or all such data structures may comprise a plurality of data structures (e.g., databases, files, archives) that may or may not all be stored on application provisioning server 100. For example, in some embodiments, data modules 150 comprise a plurality of structured and/or unstructured data records that are stored on application provisioning server 100 and/or on computers that are addressable by application provisioning server 100 across network 20.

5.1.2 Mobile Devices

Mobile devices 12 are portable battery operated handheld devices whose primary source of communication with other devices is through the use of a cellular communication protocol. Examples of mobile devices 12 include but are not limited to cellular telephones, pagers, and various forms of personal digital assistants (PDAs). Typically, a mobile device 12 weighs less than half a pound and, more typically, weighs less than 5 to 8 ounces.

Exemplary cellular communication protocols used by mobile devices 12 presently include 1 G, 2 G, 2.5 G, 2.75 G, 3 G, 3.5 G 3.75 G and 4 G. However, the present invention contemplates future generations of cellular communication protocols and mobile devices 12 of the present invention can use all such communication protocols.

Cellular communication protocols can be used to provide a network 20. Alternatively, application provisioning server 100 may be in communication with another computer through the Internet or other type of computer network (e.g., LAN) which in turn, communicates with the cellular network that mobile devices 12 use. Non-limiting exemplary cellular communication protocols are disclosed in Table 1.

TABLE 1

Exemplary communication protocols used by mobile devices of the present invention.

| Generation | Frequency | Technology | Emphasis | Remarks |
|---|---|---|---|---|
| 1 | 800 MHz range | NMT AMPS Hicap CDPD Mobitex Data Tac | Circuit-switched wireless analog voice. No data. | Limited system capacity and little protection against fraud |
| 2 | 800 900 1900 MHz range | FDMA TDMA (IS-136) CDMA GSM iDEN D-AMPS cdmaOne PDC CSD | Circuit-switched wireless digital voice and data Better security and higher capacity | More support for data communications SMS enabled |
| 2.5 | 1900 MHz range | GPRS CDMA2000-1X (1X MC) HSCSD WiDEN EDGE | circuit-switched wireless digital voice + new packet-switched data services. GPRS is an "always on" air interface to the Internet | SMS and EMS enabled |
| 3 G | 2 GHz | WCDMA CDMA2000-3X cdma2000 1xEV-DO TD-SCDMA | packet-switched wireless voice and data services, encryption, high-speed multi-media | SMS, EMS, MMS enabled |
| 3.5 |  | HSDPA |  |  |
| 3.75 |  | HSUPA |  |  |

As specified in table 1, some mobile devices 12 in accordance with the present invention use 1 G cellular communication protocols such as Nordic mobile telephone (NMT), advanced mobile phone service (AMPS), Hicap by Nippon Telegraph and Telephone, cellular digital packet data (CDPD), Mobitex, and DataTac.

Some mobile devices 12 in accordance with the present invention use 2 G cellular communication protocols such as frequency division multiple access (FDMA), time-division multiple access (TDMA), code division multiple access (CDMA), global system for mobile communications (GSM), integrated digital enhanced network (iDen), digital AMPS (D-AMPS), code division multiple access one (CDMAone), personal digital cellular (PDC), and circuit switched data (CSD).

Some mobile devices 12 in accordance with the present invention use a 2.5 G cellular communication protocol such as general packet radio service (GPRS), high-speed circuit-switched data (HSCSD), and wideband integrated dispatch enhanced network (WiDEN). GPRS is based on Internet Protocols and has a throughput of up to 40 kbit/s. GPRS provides data services such as color Internet browsing, e-mail, video streaming, multimedia messages and location-based services. Some mobile devices 12 in accordance with the present invention use a 2.5 G cellular communication protocol such as CDMA2000-1X. CDMA2000-1X enables operators with existing IS-95 systems to double overall system capacity yielding uplink speeds up to 76.8 kbps and downlink speeds up to 153.6 kbps. CDMA2000 1X supports e-mail as well as access to the Internet and corporate networks. Some mobile devices 12 in accordance with the present invention use a 2.5 G cellular communication protocol such as enhanced data for GSM evolution (EDGE). EDGE provides 3 G packet data throughput on GSM networks, and uses a modulation scheme to enable data throughput speeds of up to 384 kbit/s using existing GSM infrastructures.

Some mobile devices 12 in accordance with the present invention use a 3 G cellular communication protocol such as wide band CDMA (WCDMA) or TD-SDCDMA. WCDMA has been designed for high-speed data services and more particularly, Internet-based packet-data offering up to 2 Mbps in stationary or office environments, and up to 384 Kbps in wide area or mobile environments. WCDMA offer voices, data, motion-video and other multimedia capabilities, and increases data transmission rates in GSM systems by using CDMA instead of TDMA. See *WCDMA for UMTS, Radio Access for Third Generation Mobile Communications*, John Wiley & Sons, West Sussex, England, 2000, Holma and Toskala eds., which is hereby incorporated by reference in its entirety. Some mobile devices 12 in accordance with the present invention use a 3 G cellular communication protocol such as CDMA2000-3X. CDMA2000-3x utilizes a pair of 3.75-MHz radio channels (e.g., 3×1.25 MHz) to achieve higher data rates. The 3x version of CDMA2000 is sometimes referred to as Multi-Carrier or MC. Some mobile devices 12 in accordance with the present invention use a 3 G cellular communication protocol such as CDMA2000 1xEV-DO. CDMA2000 1xEV-DO supports downlink (forward link) data rates up to 3.1 Mbit/s and uplink (reverse link) data rates up to 1.8 Mbit/s in a radio channel dedicated to carrying high-speed packet data. Some mobile devices 12 in accordance with the present invention use a 3 G cellular communication protocol over a Universal mobile telecommunication services (UMTS) network.

Some mobile devices 12 in accordance with the present invention use a 3.5 G cellular communication protocol such as High-Speed Downlink Packet Access (HSDPA). HSDPA extends WCDMA in the same way that EV-DO extends CDMA2000. It is an evolution of the WCDMA standard and is designed to increase the available data rate by a factor of five or more. HSDPA defines a new WCDMA channel, the high-speed downlink shared channel (HS-DSCH) that operates in a different way from existing W-CDMA channels, but is only used for downlink communication to the mobile.

Some mobile devices 12 in accordance with the present invention use a 4 G cellular communication protocol such as HSUPA. HSUPA stands for High Speed Uplink Packet Access and describes a procedure for sending data through UMTS devices. HSUPA enables symmetrical data communications such as voice over internet protocol (VoIP) and interactive multimedia by better data rates and shorter delay. The suitable procedure for the receiving is HSDPA. Both HSUPA and HSDPA resemble each other technically and by the employment of special modulation procedures allow a higher extent of utilization of the net infrastructure.

In some embodiments, mobile device 12 makes use of a messaging service supported by the cellular communication protocol. For example, in some embodiments, mobile device 12 communicates with application provisioning server 100 using short messaging service (SMS) or enhanced messaging service (EMS). Enhanced Messaging Services (EMS) is an enhanced version of Short Messaging Service (SMS) and is comprised of several text messages that are clustered together. EMS provides capabilities for more rich messaging features such as sending/receiving ringtones and other melodies/sounds, pictures and animations, and modified (formatted) text. Furthermore, all of these can be sent/received as one integrated message for display on an EMS compliant mobile device. EMS is designed to work with any network that already offers SMS using the same store-and-forward infrastructure as SMS. In some embodiments, mobile device 12 communicates with application provisioning server 100 using Multi-media Messaging Services (MMS). Designed for 3 G (and beyond) networks as indicated in Table 1, MMS provides a technical solution of even richer media including text, sounds, images and video to MMS capable handsets. MMS utilizes open Internet standards for messaging.

Figure 3:
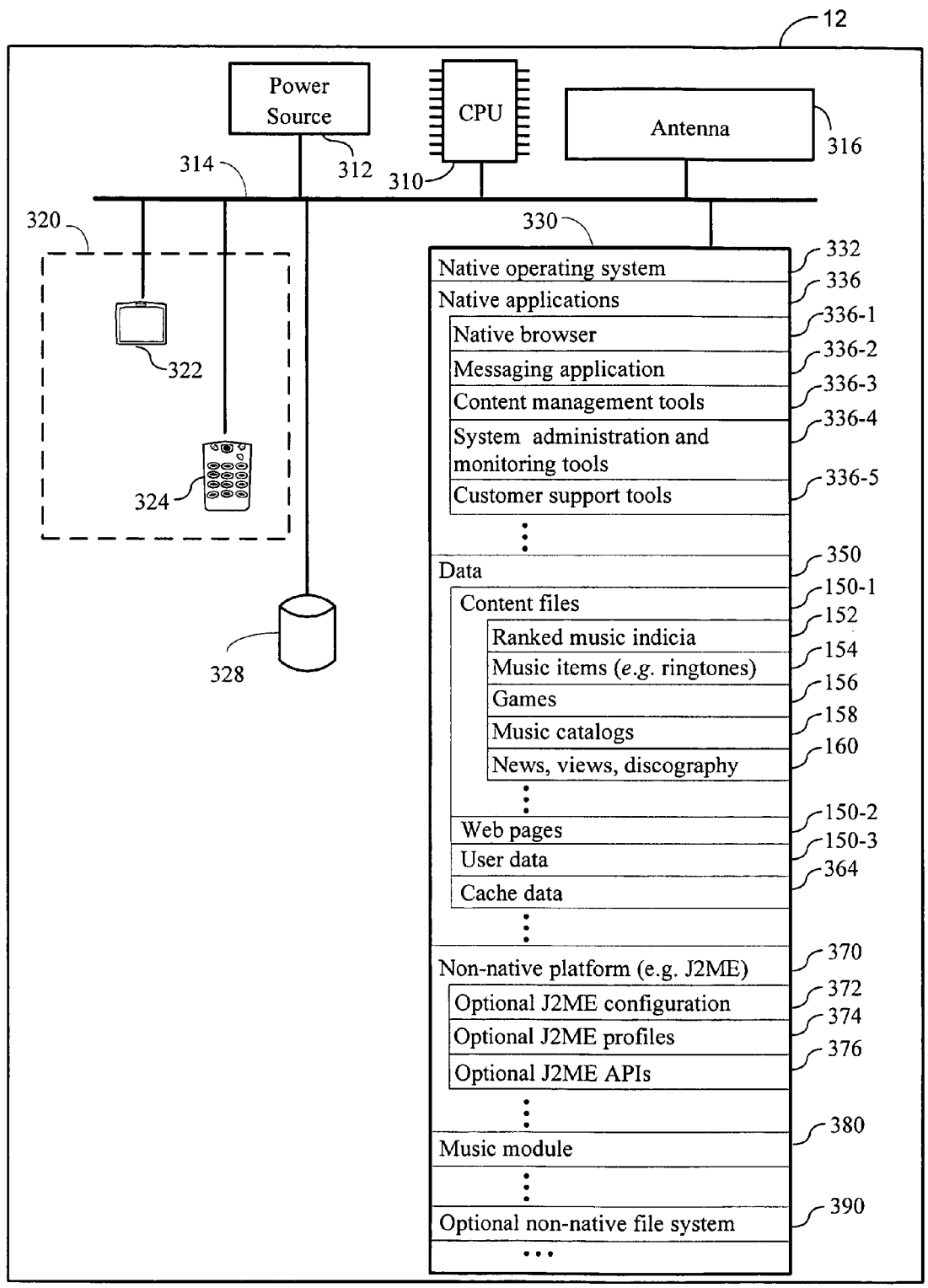
FIG. 3 illustrates a system in accordance with one embodiment of the present invention.

The system and architecture of an exemplary mobile device 12 is depicted in FIG. 3. In some embodiments, mobile device 12 is a processor based mobile computing and communications device comprising a central processing unit 310 for controlling overall operation of the device, an antenna 316 for communicating over one or more networks 20, volatile memory storage 330, and nonvolatile memory storage 328. Mobile device 12 comprises a user interface 320 having a display 322 for displaying text messages, graphics, and or other information to a user, as well as a user input device 324 such as a keypad, soft keys, buttons, a scroll wheel, or any other device for inputting user instructions and commands. Internal bus 314 provides for interconnection of the aforementioned components of mobile device 12 while power supply 312 provides power to the aforementioned components of system 300. Although not shown, mobile devices 12 include an integrate microphone and a speaker and/or headset jack.

Developments in technology and programming languages have allowed applications to be stored locally on mobile devices 12 so that they may be executed when the user is outside an area where network coverage is provided. However, these applications stored locally on mobile devices 12 are sometimes limited by the compact nature of the devices. For example, mobile devices 12 have limited user interfaces, such as small screens and condensed keyboards. Additionally, mobile devices 12 may be limited to very small amounts of memory, sometimes a few hundred kilobytes.

A typical mobile device 12 that can run non-native applications, such as Java-based applications, typically has one or more of the following capabilities: a 16-bit or 32-bit processor with a clock speed of 16 MHz or higher, at least 160 KB of non-volatile memory, at least 192 KB of total memory available for the Java platform, low power consumption, battery power operation capability, and connectivity to a cellular network that is often intermittent and of limited bandwidth. To meet demands for services and software applications relating to these and similar devices, various technologies including WAP (Wireless Application Protocol) and Java 2 Platform Micro Edition ("J2ME") have been developed to facilitate the creation and implementation of software applications that run on mobile devices 12.

Operation of mobile device 12 is controlled primarily by native operating system 332, which is executed by central processing unit 310. A native system (e.g., a native operating system) in mobile device 12 refers to any system or application that is equipped with the mobile device by the original manufacturer of the mobile device. Native operating system 332 can be stored in system memory 330. In addition to native operating system 332, in a typical implementation, system memory 330 includes one or more native application modules 336, and one or more databases or data modules 350.

Optional native applications modules 336 include but are not limited to:
 a native browser 336-1 that allows a mobile device 12 user to access network 20;
 a messaging application 336-2 for sending and receiving data 150 using, e.g., SMS, EMS, MMS, instant messages, e-mail messages, and/or other types of electronic communication;
 content management tools 336-3 formatting and scheduling data 150; and
 system administration and monitoring tools 336-4 for administering and monitoring all applications and web sites of user device 12.

In some embodiments, messaging application 336-2 may notify a user when updated information related to a music item 154 or an artist or band has been received. Content management tools 336-3 support a number of content management options such as for example, content formatting, validation, scheduling and publishing, staging and testing, emergency replacement, and alerts. As an example, content management may include converting input string from a keypad of mobile device 12 into formatted text for an address book, a phone list, or a schedule book. It also includes storage of a music item 154 (e.g., a ringtone, a full track song, etc.) received by mobile device 12 that may be accessed by mobile device 12 at a later time.

In some embodiments, system administration and monitoring tools 336-4 allow a user to set a stored music item 154, for example, a ringtone, as the default ringtone of mobile device 12. System administrative and monitoring tools 336-4 can also replace a previously stored music item with a more recently downloaded music item. The replaced music item 154 may then be deleted or stored for later use. In some embodiments, native applications 336 may further include additional customer support tools 336-5.

The one or more data modules 350 may include any number of data structures or files, for example, content files 150-1, such as ranked list of music indicia 152, music items 154 (e.g., full track songs, ringtones, etc.), games 156, music catalogs 158, as well as news, view, discography 160. In some embodiments data modules 350 include one or more cached web pages 150-2.

In some embodiments, user data 150-3 is stored on mobile device 12 to personalize mobile device 12. An example of user data 150-3 stored on mobile device 12 to personalize mobile device 12 is discussed with more detail with respect to FIG. 13 (e.g. personal settings 1312, phone number 622, zip code 624, date of birth 626, nickname 628, alerts 1314). In some embodiments, the file contents that mobile device 12 received from application provisioning server 100 are saved on mobile device 12 as cache data 364. Cache data 364 can be managed either by hardware or software on mobile device 12. In some embodiments, cached data 364 is managed by software on mobile device 12.

In the following description and corresponding figures, mobile device 12 and related methods of using system 100 to provide content to mobile device users are described in the context of delivering music items 154 such as ringtones or billboard charts to a mobile device 12. One skilled in the art will appreciate that such music items 154 are intended to be illustrative and nonlimiting, and that various other types of messages or content may be provided to a mobile device 12 user without departing from the scope of the present invention.

In embodiments in accordance with the present invention, retrieving information (e.g., a music item 154 such as a ringtone or full track song) through wireless network 20 is achieved by non-native platform 370. In one embodiment, non-native platform 370 is a Java 2 micro edition (J2ME) configuration 372, a J2ME profile 374, and a J2ME application program interface 376 (API). In other embodiments, non-native platform 370 is Symbian (e.g., Series 60), Palm OS, Microsoft Windows Mobile (previously known as Pocket PC), or equivalent platforms.

Non-native applications, for example music module 380, can be executed on non-native platform 370. In some embodiments, music module 380 is part of non-native platform 370. In some embodiments in accordance with the present invention, non-native platform 370 is used to implement a non-native file system 390 in memory 330 and/or 328.

5.2 Communications System Overview

The present invention provides communication systems and methods that deliver information between an application provisioning server 100 and mobile devices 12. In some embodiments in accordance with the present invention, the information that is communicated to mobile devices 12 comprises ranked list of music indicia 152 and a music catalog 158. For example, in some embodiments in accordance with the present invention, ranked list of music indicia 152 is in the form of a ranked list of top songs or artists. In some embodiments, the music catalog 158 contains a library of ringtones 154 that are available for downloading to mobile devices 12. In some embodiments, the availability of music items 154 may be communicated from application provisioning server 100 to mobile devices 12 through messaging application 136-1 (FIG. 1).

5.3 Exemplary Programming Tools for Mobile Devices

Java programming tools have been commonly used in application implementation on mobile devices 12 with limited capacities. Java is known primarily as a server-side programming environment, centered around the technologies that make up the Java 2 Enterprise Edition (J2EE), such as Enterprise JavaBeans (EJBs), servlets, and JavaServer pages (JSPs), and Java 2 Micro Edition (J2ME). Detailed discussion of J2ME and its implementation in mobile devices is found in by Ortiz and Giguere, 2001, *Mobile Information Device Pro-*

*file for Java 2 Micro Edition*, John Wiley & Sons; first edition, New York, which is hereby incorporated by reference herein in its entirety.

Java, also known as the Jave 2 Platform, is split into three editions: Jave 2 Standard Edition (J2SE), Jave 2 Enterprise Edition (J2EE), and Jave 2 Micro Edition (J2ME). Each edition of the platform provides a complete environment for running Java-based applications, including the Java virtual machine (VM) and runtime classes.

The three editions all target different kinds of applications running on different kinds of devices. Desktop-based applications are developed using J2SE, which provides the necessary user interface classes. Server-based applications are developed using J2EE, which emphasizes component-based programming and deployment. Handheld and embedded devices are targeted by J2ME (for example as non-native platform 370 of FIG. 3).

What separates one edition from another is primarily the set of class libraries that each edition defines. Loosely speaking, J2ME may be considered a subset of J2SE and J2SE as a subset of J2EE. It is possible to run the same Java bytecode in each edition, providing the classes referred to by the bytecode are available in all three editions. The catch, of course, is that J2ME-based devices have fewer classes than what J2SE and J2EE provide, especially the smaller devices. There are several thousand core J2SE runtime classes, taking up ten to twenty megabytes of space, which is simply too big for the majority of mobile devices 12. The various specifications that comprise J2ME are all defined through the Java Community Process (JCP), as is done with J2SE and J2EE. For more information, see the main JCP web site.

Figure 5:
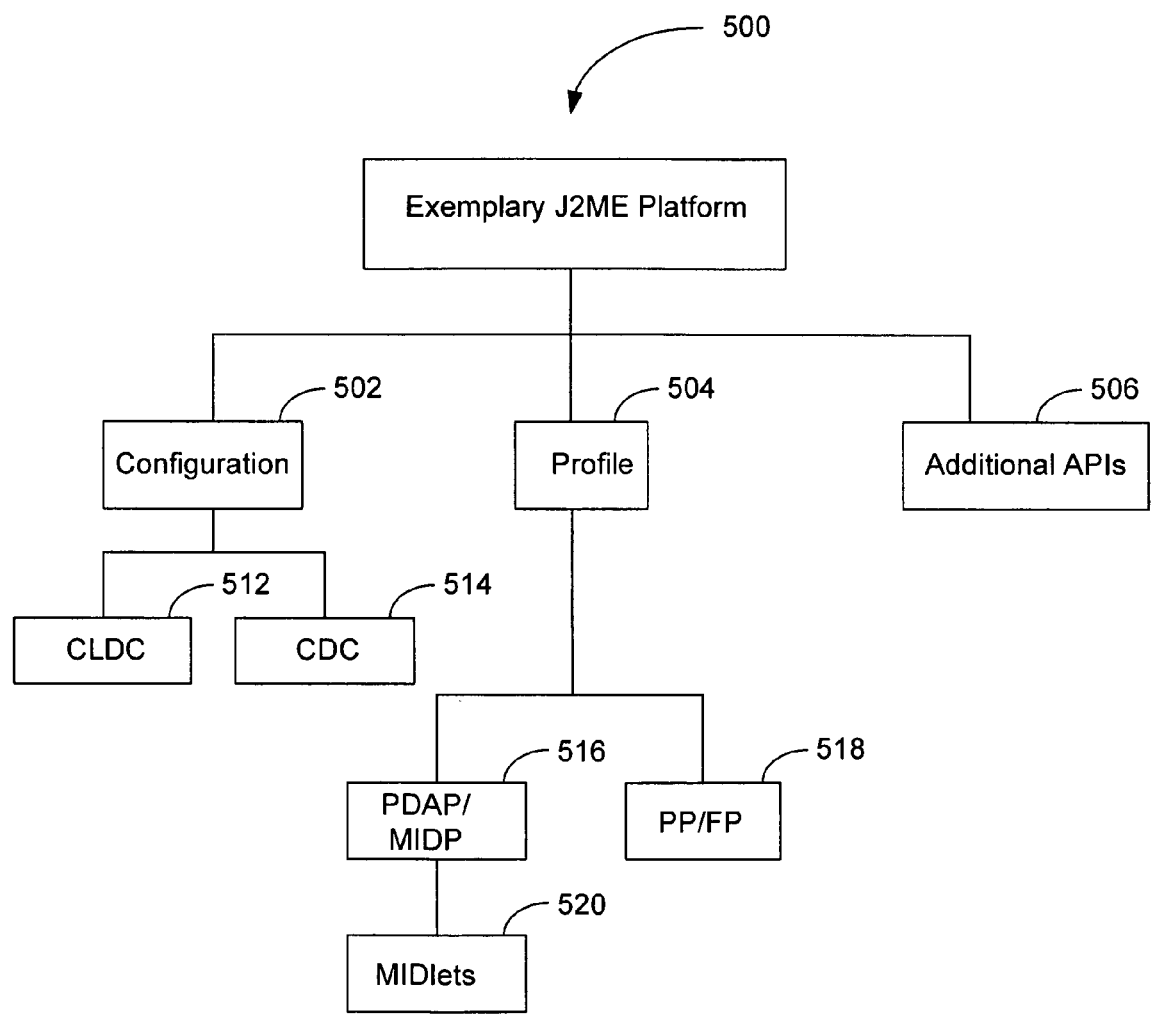
FIG. 5 illustrates an exemplary J2ME platform in accordance with one embodiment of the present invention.

Referring to FIG. 5, one type of non-native platform 370 is the Jave 2 Micro Edition platform 500 (J2ME). J2ME comprises three core elements: configurations 502, profiles 504, and optional packages such as application programming interfaces (APIs) 506. Collectively, a configuration 502, profile 504 and some optional packages determine the features of Java that can be used, which application programming interfaces (APIs) are available, and how such applications are packaged.

Configurations 502. A configuration 502 is a complete Java runtime environment, consisting of three things: a Java virtual machine (VM) to execute Java bytecode, native code to interface to the underlying system, and a set of core Java runtime classes. To use a configuration 502, a mobile device 12 must meet certain minimum requirements as defined in the configuration's formal specification. Although a configuration 502 does provide a complete Java environment, the set of core classes is normally quite small and must be enhanced with additional classes supplied by J2ME profiles or by a configuration implementer. In particular, configurations 502 do not define any user interface classes.

J2ME 500 defines two configurations 502, the Connected Limited Device Configuration (CLDC) 512 and the Connected Device Configuration (CDC) 514. The CLDC is for very constrained (limited) devices. Such devices contain small amounts of memory and/or slow processors, for example, a conventional mobile device 12 such as a cell phone or a PDA. The VM used by CLDC 512 omits important features like finalization, while the set of core runtime classes is a tiny fraction of the J2SE core classes, just the basics from the java.lang, java.io and java.util packages, with a few additional classes from the new javax.microedition.io package.

CLDC 512 is designed to bring the many advantages of the Java platform to network-connected devices that have limited processing power, memory, and graphical capability, such as cellular phones, pagers, low-end personal organizers, and machine-to-machine equipment. In addition, CLDC 512 can also be deployed in home appliances, TV set-top boxes, and point-of-sale terminals.

Profiles 504. A profile 504 adds domain-specific classes to a configuration 502 to fill in missing functionality and to support specific uses of a device. For example, most profiles 504 define user interface classes for building interactive applications. To use a profile 504, the device must meet all the minimum requirements of the underlying configuration as well as any additional requirements mandated by the profile's formal specification. There are several profiles 504. For instance, the Mobile Information Device Profile (MIDP) 516 is a CLDC-based profile for running applications on cell phones and interactive pagers with small screens, wireless HTTP connectivity, and limited memory. Another CLDC-based profile is the Personal Digital Assistant Profile (PDAP) 516, which extends MIDP with additional classes and features for more powerful handheld devices. In terms of CDC-based profiles 504, the Foundation Profile (FP) 518 extends the CDC with additional J2SE classes, the Personal Basis Profile (PBP/PP) 518 extends the FP profile with lightweight (AWT-derived) user interface classes and an application model, and the Personal Profile extends the PBP with applet support and heavyweight UI classes. PP and FP 518 are compatible with CDC 514, while PDAP and MIDP 516 are compatible with CLDC 512.

A MIDP application is referred to as a MIDlet 520. Essentially, a MIDlet 520 is a Java program for embedded devices, more specifically the Java ME virtual machine. MIDlets 520 generally run on any device that implements the MIDP profile 504. Generally, MIDlets 520 comprise games and applications that run on mobile devices 12.

In general, a MIDlet 520 has to fulfill some requirements in order to run on a mobile device 12. For example, first, the main class of a MIDlet needs to be a subclass of javax.microedition.midlet.MIDlet. Second, the MIDlet needs to be packed inside a Java™ Archive (JAR) file (e.g., by using the jar-tool). Third, the JAR file needs to be pre-verified by using a pre-verifier. Fourth, in some cases, the JAR file needs to be signed by the mobile phone's carrier.

One or more MIDlets 520 are packaged together into a MIDlet suite, which is basically a standard JAR file and a separate file called an application descriptor. All the user-defined classes required by the suite's MIDlets are in the JAR file, along with any other resources, such as images, that the MIDlets 520 require. The JAR file also includes a manifest with a number of MIDP-specific entries that describe the MIDlets 502 in the suite. The application descriptor contains similar information, and is used by devices to obtain information about a MIDlet suite without having to download and install the MIDlet suite first.

Additional APIs 506. Additional APIs 506 support additional behaviors or functions that do not usually belong in one specific configuration 502 or profile 504. Bluetooth support, for example, is defined as an optional package 506. Making Bluetooth support part of a profile 504 does not work because none of the behaviors of a profile 504 can be optional. If a device supports a profile 504, it must support the entire profile. Therefore, a profile 504 containing Bluetooth support would limit the profile to Bluetooth-enabled devices.

Like configurations 502 and profiles 504, optional APIs 506 have their own minimum requirements. Optional APIs 506 also have specific dependencies on a particular configuration 502 and/or one or more profiles 504. Optional APIs 506 alone do not define a complete runtime environment. Instead, they only define sets of related APIs. For example, there are many optional APIs 506, including the RMI optional package, which adds RMI support to CDC-based profiles, the Java APIs for Bluetooth, which adds Bluetooth support to CLDC-based profiles, and the JDBC optional package for CDC/Foundation Profile, which defines a subset of JDBC (database access APIs) for use with CDC/FP-based profiles.

5.4 An Exemplary Embodiment of a Non-native Application

Figure 4A:
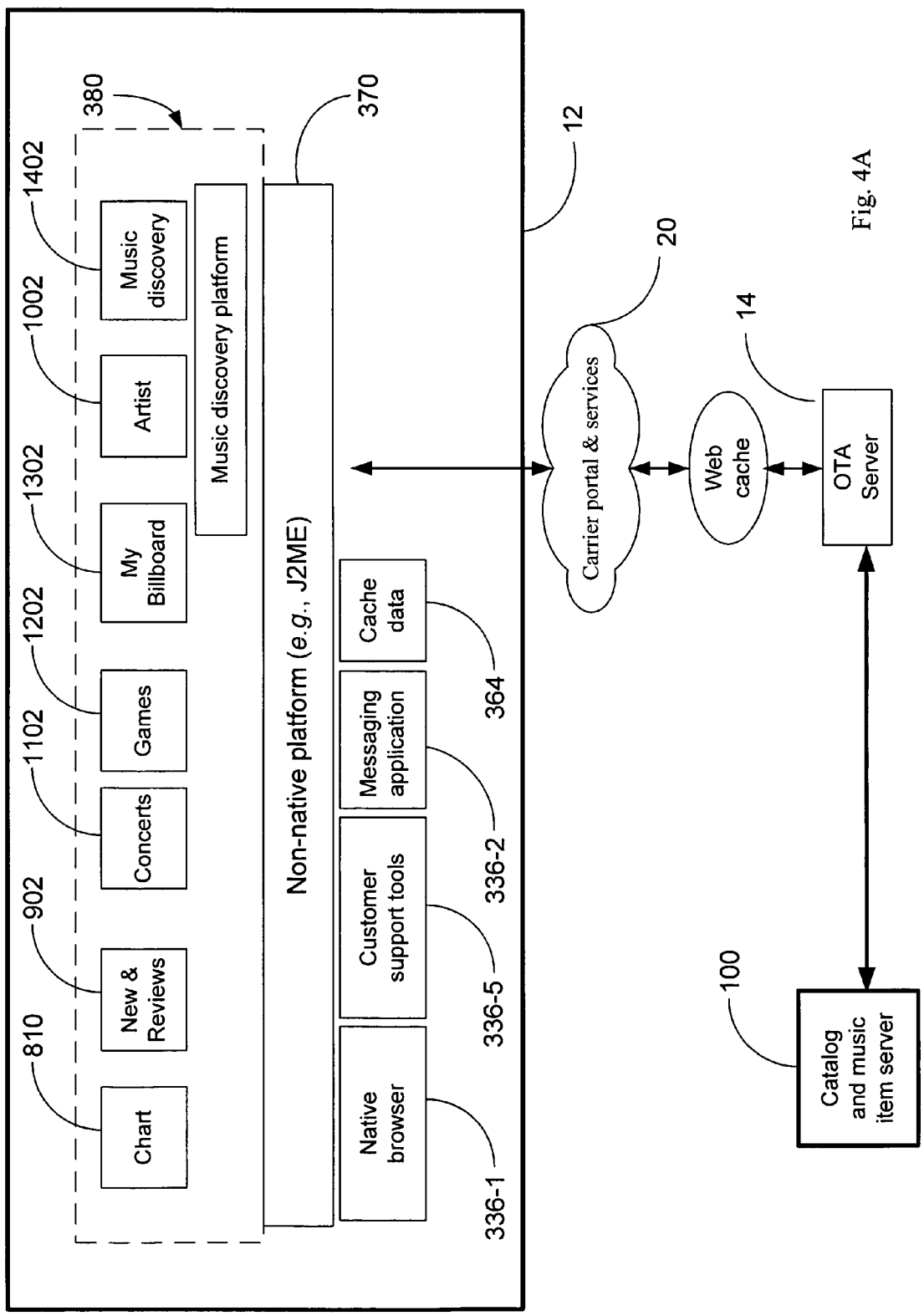
FIG. 4A illustrates a system in accordance with one embodiment of the present invention.

FIG. 4A depicts an exemplary music module 380 that enables communications between a music catalog 158 stored on an application provisioning server 100 and a mobile device 12. In some embodiments, music module 380 comprises a plurality of modules related to specific purposes of the communication between an application provisioning server 100 and a mobile device 12. The modules receive and display specialized data 150 from application provisioning server 100. For example, a chart module 810 receives and displays ranked list of music indicia 152. Music discovery module 1402 (e.g., a ringtone download or music store module) allows a user to preview or download one or more music items 154. News and reviews module 902 displays information on music- or artist-related news and reviews 160. Artist module 1002 displays artist-related information including news and reviews 160. Concert module 1102 allows users to search for artist or music specific events in a geographic area. Game module 1202 provides music trivia games 156. My billboard module 1302 allows user to personalize user settings. In some embodiments, the plurality of modules are established on a non-native platform 370 such as a J2ME platform. In some embodiments, the plurality of modules are native to mobile device 12.

In some embodiments, messaging application 336-2 (FIG. 3) enables mobile devices 12 to establish SMS, EMS, MMS, instant messages, e-mail messages, or other forms of wireless cell phone based electronic communication through an internet portal in conjunction with browser application 336-1 (FIG. 3). In some embodiments, customer support tools 336-5 allow for the transfer of billing information (FIG. 3).

In some embodiments, music previewing is achieved by music module 380 and receiving and storing of the music item 154 is achieved separately by native browser application 336-1. In other embodiments, music previewing, receiving and storing of music items 154 is provided by music module 380.

In some embodiments, the application establishing the communication between application provisioning server 100 and mobile device 12 is music module 380. It is to be appreciated that in other embodiments, customer support tools 336-5 may be built to serve the same or similar function. In some embodiments, music module 380 is downloaded to mobile device 12 using native browser application 336-1 through wireless network 20. In some embodiments, music module 380 is permanently stored on mobile device 12 such that only a license or code is needed to activate the application.

In some embodiments, data 150 on application provisioning server 100 and mobile devices 12 is organized similarly to promote efficient information communication between the two platforms. In some embodiments, customer support application 136-3 receives data 150 requests from mobile device 12, finds the data 150, and delivers the data 150 to mobile device 12.

5.5 Exemplary Embodiments

Some embodiments in accordance with the present invention contain graphics and dynamically rendered fonts to enrich the user experience. Some embodiments feature an interface comprising a selection of modules, for example, charts containing ranked list of music indicia 152 and/or personalization options. Additional embodiments of the present invention comprise modules that provide news feeds, artist information (including biography, discography, reviews, etc,), and/or music trivia all collectively referenced in FIGS. 1 and 3 as news, views, discography 150. In one embodiment in accordance with the present invention, one or modules further provide one or more links to relevant websites 150-2, for example, a purchase page where the user can pay for and download one or more products (e.g., cell phone ringtones 154).

5.5.1 Billboard Mobile Channel Embodiment

Figure 4B:
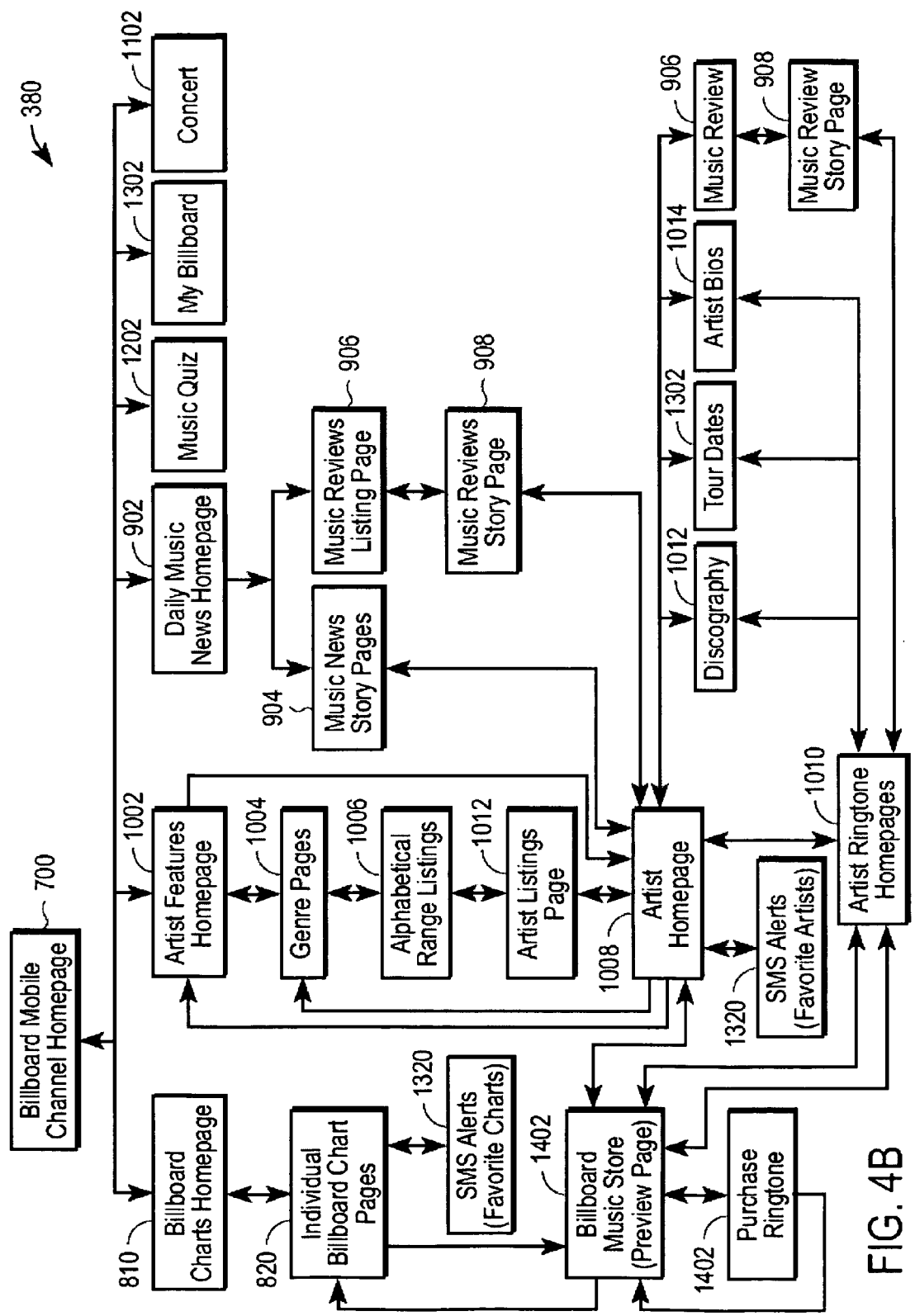
FIG. 4B illustrates the states of a program run on a mobile device in accordance with one embodiment of the present invention.

One exemplary embodiment in accordance with the present invention is the Billboard Mobile Channel program. The overall organization of the Billboard Mobile Channel program is depicted in FIG. 4B. At the top level, the Billboard Mobile Channel homepage 700 is linked to multiples modules (e.g., 810, 902, 1002, 1102, 1202, and 1302 in FIG. 4B). The Billboard Mobile Channel homepage 700 and its respective linked pages are examples of web page 150-2 that are hosted by application provisioning server 100.

The modules linked to the Billboard Mobile Channel homepage 700 are defined as top-level functional moieties that may be accessed directly from the Billboard Mobile Channel homepage 700. In the exemplary embodiment, the modules comprise a Billboard Charts module 810, an Artist Features module 1002, a Daily Music News module 902 (called as a News and Reviews module 902 in some embodiments), a Music Quiz module 1202, a Concert module 1102 and a My Billboard module 1302. Each of these modules is further linked to child pages. For example, the Billboard Chart module 810 is linked to the Billboard individual chart pages 820 which, in turn, are linked to corresponding Billboard music store (preview) pages 1402. On music store pages 1402, users may preview and/or purchase selected music items. In some embodiments, a selected music item 154 (e.g., a ringtone, a full track song, etc.) is played on mobile device 12 through standard mobile streaming technology without permanent storage. In other embodiments, a selected music item 154 (e.g., a ringtone, a full track song, etc.) is permanently stored on mobile device 12. Music items 154 can be downloaded either through music store module 1402 or by using a native web browser 336-1 that is already stored on mobile device 12. In some embodiments, after the selected music item 154 is permanently stored on mobile device 12, a message (e.g., a SMS, PSMS, EMS, MMS, instant messages, e-mail messages, and/or other type of electronic messages is delivered to the mobile to convey a charge for the music item 154. In some embodiments, the information transfer is facilitated by a cellular network.

Also, for example, feature artist module 1002 is linked to genre pages 1004 where music genres are listed, for example, in alphabetical range listings 1006. Such listings are examples of music catalogs 158 (FIGS. 1 and 3). Within each genre, artists or groups of artists are listed in artist listings page 1012 in accordance with an ordering scheme, e.g., in alphabetical order, in chronological order, by most record sold, etc. From artist listings page 1012, a user may further access individual artist pages 1008. From an individual artist page 1008, a user may select to view discography 1012, tour dates 1302, and the artist biography 1014 of selected artists. Such artist information is one example of news, views, discography 160 (FIGS. 1 and 3). From an individual artist page

1008, a user may also view a list ringtones of the selected artist at page 1010 and subsequently choose to purchase or preview the selected ringtone at music store/preview page 1402. In a separate example, a user may access a Daily Music News Homepage 902 from homepage 700. From Daily Music News Homepage module 902, a user may select to read music news stories 904 or see a music review listing 906. A complete version of the reviews is on music review story page 908, which can be accessed by either Music Reviews Listing Page 906 or Artist Homepage 1008.

An exemplary embodiment of the Billboard Mobile Channel homepage 700 may include additional modules, for example, a music quiz module 1202 (also called a game module). Such games are examples of games 158 of FIGS. 1 and 3. Additional modules include concert or other local event module 1102 as well as a My Billboard Module 1302 where a user may set up alerts for news, reviews or ringtones of favorite artists or bands. Such alerts are facilitated by SMS alerts 1320 and/or messaging application 136-1. In some embodiments, messaging application 136-1 provides SMS alert 1320 functionality. In some embodiments, rather than using SMS, another form of messaging communication is used such as EMS or MMS.

Figure 6A:
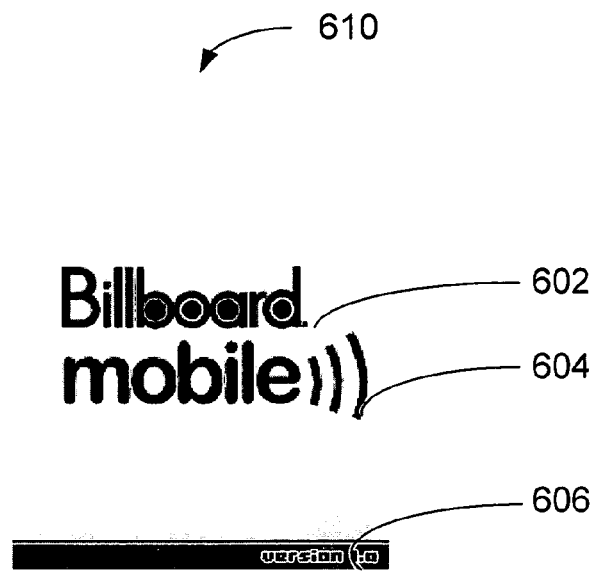
FIG. 6A illustrates a start up screen for a program run on a mobile device in accordance with one embodiment of the present invention.

Modules of the Billboard Mobile Channel Program. The initiation of the Billboard Mobile Channel program, an example of music module 380, on a mobile device 12 is depicted by panel 610 of FIG. 6A. The launching page of the program comprises a program logo 602 and a program version 606. In some embodiments in accordance with the present invention, a part of the launching page of the program includes a static symbol or a dynamic animation of the symbol (e.g., 604 in FIG. 6A). In some embodiments, for example, the Billboard Mobile Channel, the program in accordance with the presentation is a graphically rich, music information and discovery J2ME-based application.

In some embodiments a customized registration screen 620 (FIG. 6B) is displayed on the screen of mobile device 12 after the Billboard Mobile Channel program has launched. In some embodiments, registration screen 620 comprises an option for the user to enter a phone number 622, a zip code 624, and additional personalized information such as birthday 626 and user nickname 628. In some embodiments, registration screen 620 also includes a back option 630 to allow a user to go back to the previous screen and a menu option 640 to allow a user to return to a menu page.

In some embodiments, the Billboard Mobile Channel features a selection of ranked list of music indicia 152 (e.g., charts), news feeds, artist information (for example, news, views, discography 160, etc.), a trivia application 156, and personalization options. In Billboard Mobile Channel, artist or song related content include the option of being associated with a web link to a purchase page whereby the user can pay for and download select ringtones.

Figure 7:
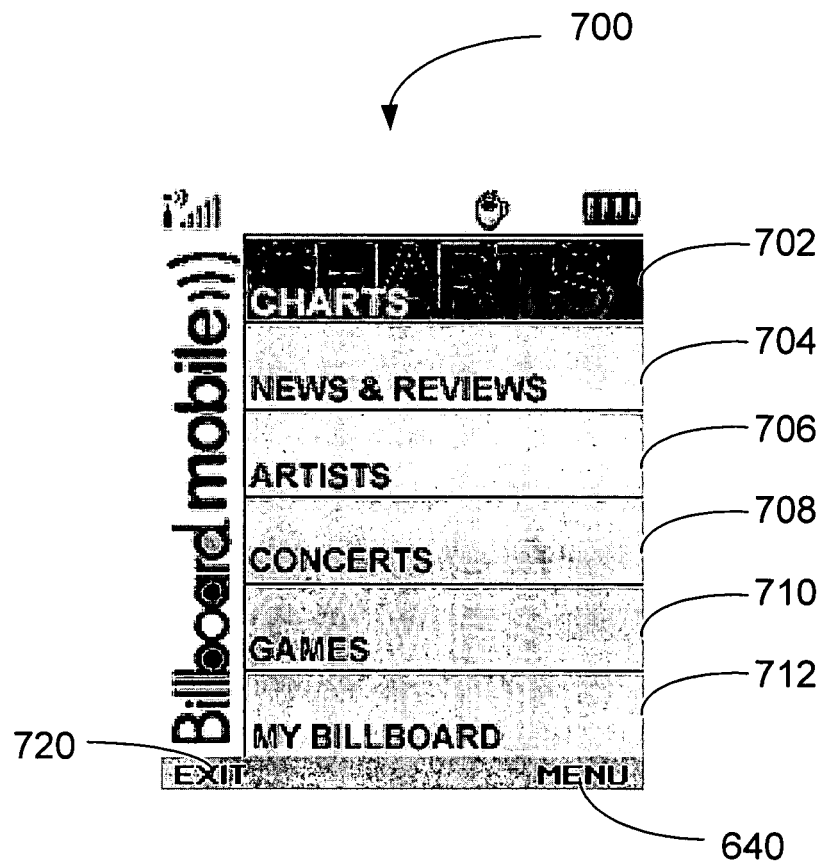
FIG. 7 illustrates a menu in a program permanently stored on a mobile device in accordance with one embodiment of the present invention.

FIG. 7 depicts a top level menu 700 for an exemplary embodiment in accordance with the present invention (e.g., Billboard Mobile Channel). This top level interface comprises multiple modules: Charts Module (labeled as "Charts," e.g., 702 in FIG. 7), Daily News & Reviews Module (labeled as "News & Reviews," e.g., 704 in FIG. 7), Artist Module (labeled as "Artists," e.g., 706 in FIG. 7), Local Events Module (labeled as "Concerts," e.g., 708 in FIG. 7), Trivia Game Module (labeled as "Games," e.g., 710 in FIG. 7), and My Billboard module (labeled as "My Billboard," e.g., 712 in FIG. 7). When selected, a module adopts a color scheme that is different from the other modules (e.g., 702 in FIG. 7 is highlighted in white to distinguish from the other modules). The top level menu page also provides the option to exit the program (e.g., 720 in FIG. 7) and to return to the top level menu page from a selected module page (e.g., 640 in FIG. 7).

Charts. Charts module 702 is a mobile re-creation of the Billboard Charts. In some embodiments, the module provides ranked list of music indicia 152 comprising a ranked list of songs, albums, or ringtones. In some embodiments, each ranked list of music indicia (e.g. chart) 152 is labeled, and each such ranked list of music indicia provides the ranking position for each of a plurality of songs over a given time period (e.g., day, week, month, year, etc.). Some or all of the songs in such a ranked list of music indicia 152 can be selected for ringtone purchase, artist/tone updates and linkage to individual artist pages. Some or all chart-based ringtones are available for audio preview via a query and stream feature. In some embodiments, ranked list of music indicia 152 comprise instructions for providing ranked list of music indicia as a function of user directed input that includes an artist, band, orchestra, or genre.

Figures 8A, 8B:
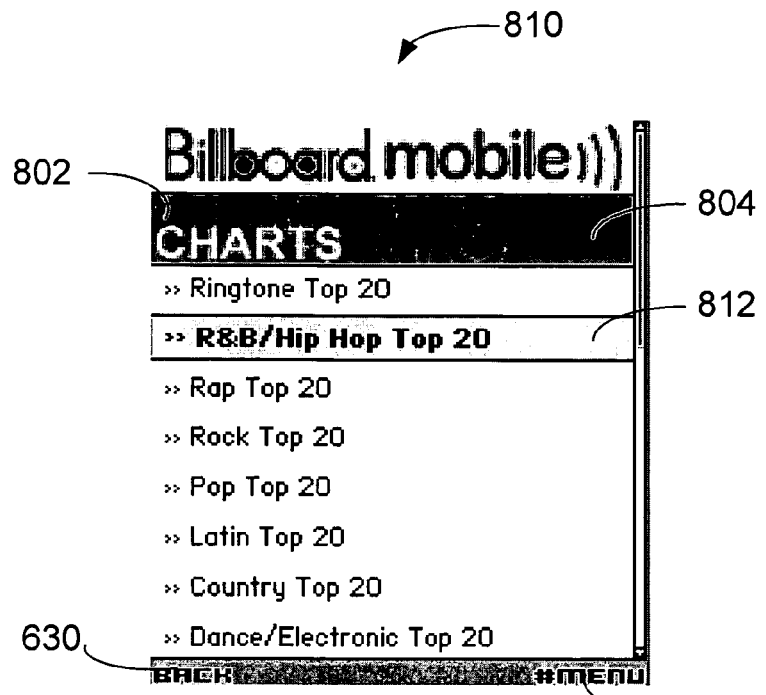
FIG. 8A depicts a collector page that guides subscribers through specific charts in accordance with one embodiment of the present invention.
FIG. 8B illustrates a ranked list of music indicia in accordance with one embodiment of the present invention.

Detailed sub-level embodiments of chart module 702 are depicted in FIGS. 8A and 8B. FIG. 8A illustrates collector page 810 that guides subscribers of Billboard Mobile Channel through Specific Billboard-branded charts. In an exemplary embodiment, module 702 is labeled as "Charts" (e.g., 802 in FIG. 8A) in an optional background that consists of a pattern and a color, e.g., 804 in FIG. 8A. In an exemplary embodiment, collector page 810 comprises links to a plurality of ranked list of music indicia 152, for example, Ringtone Top 20, R&B/HipHop Top 20, Rock Top 20, Pop Top 20, Latin Top 20, Country Top 20, and Rap Top 20. In some embodiments, a list in the plurality of ranked list of music indicia 152, for example, Ringtone Top 20 list, comprises a list of the top 20 ringtones ranked by number of downloads. R&B/HipHop Top 20, Rock Top 20, Pop Top 20, Latin Top 20, Country Top 20, and Rap Top 20 pages comprises a ranked list of music indicia 152 that are sorted by genre. The order of the ranked items in a particular ranked list of music indicia 152 is predetermined, for example by the Billboard magazine or by Internet download records. In some embodiments, the ranked list of music indicia 152 on collector page 810 are updated in accordance with Billboard magazine or Internet download record.

The number of ranked lists of music indicia 152 presented on page 810 is potentially unlimited. From a usability point of view, it is recommended that no more than 20 ranked lists of music indicia 152 (charts) be included in some embodiments. The rationale is that the recommended maximum number of line items per page is twenty so users only have to proceed through at most two pages in order to see the entire list of available ranked lists of music indicia 152 (e.g. charts). In alternative embodiments in accordance with the present invention, page 810 may comprises fewer than 20 ranked lists of music indicia 152. In other embodiments page 810 may comprise more than 20 ranked lists of music indicia 152. In some embodiments, page 810 may comprise 5 ranked lists of indicia or more, 10 ranked lists of music indicia or more, 15 ranked lists of music indicia or more, 20 ranked lists of music indicia or more, 30 ranked lists of music indicia or more, or 50 ranked lists of music indicia or more.

The order of the ranked lists of music indicia in Billboard Charts can be configured differently from the order illustrated in FIG. 8A. For example, ranked lists of music indicia 152 can be modified to include new or additional items. In some embodiments, the default item order is alphabetic. In some embodiments, the ranked lists of music indicia 152 categories are used to drive the list of genres that are employed in the application to categorize artists and new releases. In one of the embodiments of Billboard Mobile Channel, the header color of chart module 702 is purple. In some embodiments, the accessibility to chart module 702 is restricted to Billboard Mobile Channel and Billboard Chart subscribers. In some embodiments, users may choose to go back to the previous screen via a back option (e.g., 630 in FIG. 6A) and to return to a menu page via a menu option (e.g., 640 in FIG. 6A). Selecting a ranked list of music indicia 152 (e.g. chart) from among the plurality of ranked lists of music indicia 152 in page 810 leads to a more detailed ranked list of music indicia 152, e.g., depicted as chart 820 in FIG. 8B. In some embodiments, the selected ranked lists of music indicia in FIG. 8A is highlighted in a color that is different from other ranked lists of music indicia in page 810, e.g., shown as selection 812 in FIG. 8A.

In some embodiments, a detailed ranked list of music indicia 152 comprises top twenty music items (e.g., top 20 ringtones shown as chart 820 in FIG. 8B). In some embodiments, an item in a ranked list of music indicia comprises the title 822 of a music item 152, the ranking 824 of the music item 154 over a first time period (e.g., previous minute, previous hour, previous day, previous week, previous month, previous year, previous decade, eternity), and the ranking of the item from another time period (e.g., 826 in FIG. 8B). In some embodiments, when selected, a music item 154 is highlighted in a color that is different from other music items 154 on the list (e.g., 822 in FIG. 8B). In alternative embodiments, a ranked top ringtone list or a ranked top music item list (examples of ranked lists of music indicia 152) may comprise more than twenty items. In some embodiments, a ranked top ringtone list comprises fewer than 20 items. In some embodiments, a ranked list of music indicia 152 comprises 5 music items or more, 10 music items or more, 15 music items or more, 20 music items or more, 30 music items or more, or 50 music items or more. In addition, the ranked list of music indicia 152 is not restricted to a ringtone list or to a ranked list of any music genre.

Figure 14:
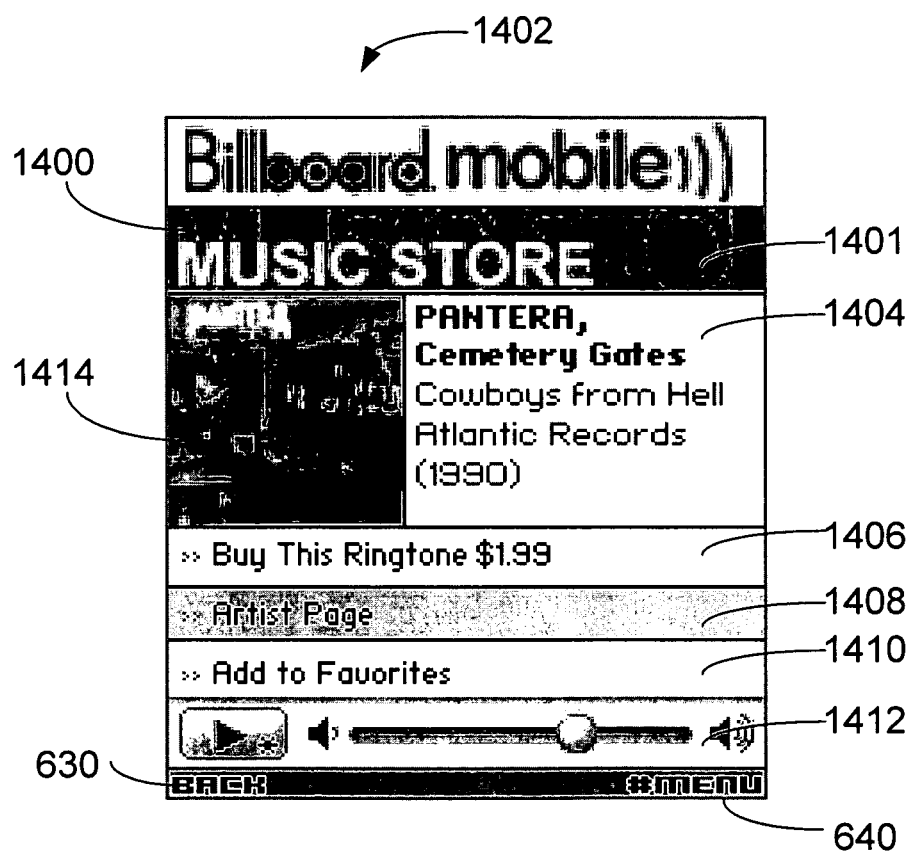
FIG. 14 illustrates a music store module in accordance with an embodiment of the present invention.

Selecting a music item from a ranked list as shown in FIG. 8B provides a link to a music store module (e.g., 1402 in FIG. 14). In music store module 1402, a title 1400 is depicted on background 1401. Music Store module 1402 further comprises information about music items 154 (e.g., title of the music item, performing artist or group of artists and record year, depicted as 1404 in FIG. 14) and a photo of the artist or group of artists when available (e.g., 1414 in FIG. 14). In some embodiments, music store module 1402 further provides a link 1406 where a user may purchase the selected music item 154, a link to the artist or group of artists that are associated with the selected music item 154 (e.g., 1408 in FIG. 14), and a choice to configure the selected music 154 as one of the favorites (e.g., 1410 in FIG. 14). In addition, music store module 1402 provides a user the option of previewing the selected music item 154 by using option 1412. In some embodiments in accordance with the present invention, option 1412 provides a user the option of adjusting the volume of and replaying the selected music item 154 as depicted in FIG. 14. In other embodiments, a selected music item 154 (e.g., a ringtone, a full track song, etc.) may be permanently stored on mobile device 12. In such embodiments, the music item 154 may be downloaded either through music store module 1402 or by using a native web browser 336-1 that is already stored on mobile device 12.

After previewing or purchasing the selected music item 154, the user can opt to go back to the previous module via the back option 630 or to return to the top level menu of the Billboard (e.g., 640 in FIG. 14). In addition, in some embodiments, for at least one page in chart module 702, a scroll bar (e.g., 830 in FIG. 8B) is used to navigate the content listed on the page.

News & Reviews. The News & Reviews module of the exemplary embodiment of Billboard Mobile Channel program, depicted as News & Review module 704 in FIG. 7, draws information from the Billboard.com XML news feed. News & Reviews module 704 provides music related news and reviews comprises instructions for providing music related news and reviews as a function of user directed input that includes a designated venue, artist, band, orchestra, genre, zip code, group of artists, or album. The news and reviews provided by News & Reviews module 704 concerns a venue, artist, band, orchestra, genre, zip code, group of artists, or album. In some embodiments, the information accessible through News & Reviews module 704 is updated every hour, day, week, month or year (if there is new information available). The details of News & Reviews module 704 are depicted in FIGS. 9A through 9D. Selecting News & Review module 704 from top menu 700 leads a user to front page 902 of FIG. 9A. The title of front page 902 is shown as 930 in a background 931 that comprises a pattern and a color. In some embodiments, the pattern and color in background 931 are different from the pattern and color defined in background 804. Front page 902 of New & Reviews module 704 provides subscribers access to one leading feature story (e.g., 912 in FIG. 9A) and a photo, for example of the artist or group of artists, associated with the leading feature story when available (e.g., 910 in FIG. 9A). Featured headline 912 is followed immediately by a link to a review module 916. In some embodiments, front page 902 comprises a list of all of the other headlines (e.g., 914 in FIG. 9A) for the day.

By selecting read story 918 (FIG. 9A) from front page 902, a user can access the full length feature headline on 904 in FIG. 9B. The full length feature headline page 904 retains the title and the photo associated with the headline story (e.g., 912 in FIGS. 9A and 9B). In addition, the full feature story is shown as 920.

By selecting reviews 916 (FIG. 9A) from News & Reviews front page 902, a user may access a review page depicted as 906 in FIG. 9C. Like the other front pages, the title 930 is shown in Reviews front page 906. The title of the feature review (e.g., 926 in FIG. 9C) is shown along with a photo associated with the review (e.g., 930 in FIG. 9A). Titles of additional reviews (e.g., 924 in FIG. 9C) are also listed on front page 906 in FIG. 9C. By selecting read review 922 and one of the titles of the additional reviews in 924 provides the user the full length of the select review (e.g., 908 in FIG. 9D). In FIG. 9D, the title of the selected review (e.g., 926) is depicted with the photo associated with the selected review (e.g., 930 in FIG. 9D) as well as the full length review (e.g., 928 in FIG. 9A).

At the front page or any other page in News & Review module 704, a user can choose to go back to a previous page via the back option (e.g., 630 in FIG. 9A) or to return to the top menu page via the menu option (e.g., 640 in FIG. 9A). In addition, at least in some embodiments and one at least one page in News & Review module 704, a scroll bar (e.g., 830 in FIG. 9D) is used to navigate the content listed on the page.

Artists. Artists module 706 (FIG. 7) draws information from the All Music Guide XML feed. Artist module 706 provides information about artists or groups of artists. Users can search by genre and artist. In some embodiments, Artist module 706 comprises instructions for providing information about an artist or a group of artists as a function of user directed input that includes an artist, band, orchestra, or genre. Each artist page consists of the following categories:

tour dates, biography, news, discography, ringtones & get artist update. Front page 1002 (FIG. 10A) of artist module 706 comprises a title 1000 on a background 1001, the name 1016 and genre 1044 of a featured artist, a photo associated with a featured artist or group of artists (e.g., 1032 in FIG. 10A), and a list of genre (e.g., 1018 in FIG. 10A). Background 1001 comprises a color and a pattern that is associated with artist module 706. In some embodiments, the background color and pattern defined in 1001 in FIG. 10A are unique to artist module 706. From the artist genre list, a user can access a dedicated artist genre page (e.g., 1044 in FIG. 10A) where artists in a particular genre are arranged in alphabetic order. A featured artist page can be accessed from artist front page 1002 through the more option (e.g., 1038 in FIG. 10A).

In some embodiments, genre list 1018 in Artist module 706 is the same as the Chart genre categories in chart module 810 (FIG. 8A). For example, in some embodiments, the genres to be used at launch are: R&B/HipHop, pop, rock, Latin, country and rap (e.g., 1018 in FIG. 10A). Selecting a genre type (e.g., 1046 in FIG. 10A) provides a user access to an artist genre page (e.g., 1004 in FIG. 10B). Within the artist genre list, subheader 1050 identifies the current genre while artists in the current genre are listed by order (e.g., 1020 in FIG. 10B). In some embodiments, the ordering of genres is an alphabetic order. Selecting an alphabet range (e.g., 1020 in FIG. 10B) allows a user access to an artist list page 1006 containing a catalog 158 of artists (FIG. 10C). Selecting an artist from the catalog of artist 158 provides a user access to an artist page (e.g., 1008 in FIG. 10D). Artist page 1008 comprises the name of the artist or band (e.g., 1016 in FIG. 10D), the genre of the artist or group of artists (e.g., 1044 in FIG. 10D), and a photo associated with the artist or group of artists (e.g., 1032 in FIG. 10D). In some embodiments, artist page 1008 further comprises a link to the news page (e.g., 1022 in FIG. 10D), a link to the artist discography page (e.g., 1024 in FIG. 10D), a link to ringtones by the selected artist (e.g., 1026 in FIG. 10D), and an option for the user to set the selected artist or group of artists as one of the favorite artists or group of artists (e.g., 1028 in FIG. 10D), Ringtone option 1026 in FIG. 10D provides access to a ringtone page 1010 of FIG. 10E. A catalog 158 of ringtones associated with the selected artist or group of artists are provided in ringtone page 1010. Selecting a ringtone 1036 in FIG. 10D leads a user to the music store page (e.g., 1402 in FIGS. 4B and 14) where the user is provided with the choice of previewing and purchasing the ringtone.

Discography option 1024 in FIG. 10D provides access to an artist discography page 1012 of FIG. 10F where albums associated with the selected artist or group of artists are listed according to a pre-determined order as a catalog 158. In some embodiments, the pre-determined order is an alphabetic order. In other embodiments, the pre-determined order is a chronological order of the publication date of the albums. Selecting one album from the list of albums in artist discography 1012 leads a user to the appropriate album (e.g., 1040 in FIG. 10F).

In some embodiments, the artist title option 1016 of FIG. 10D provides access to an artist biography page 1014 of FIG. 10G. Artist biography page 1014 comprises a title of the biography (e.g., 1048 in FIG. 10G), a photo associated with the selected artist or group of artists (e.g., 1032 in FIG. 10G) and a biography of the selected artist or group of artists (e.g., 1042 in FIG. 10G).

In some embodiments, the listing of genres in artist module 706 is same as those listed for Music Reviews & New Releases Homepage 704. In other embodiments, the listing of genres in artist module 706 needs not to be the same as those listed for Music Reviews and New Releases Homepage 704. The number of genres supported in 1018 will not be limited. Although from a usability point of view, it is recommended that no more than 20 genres should be listed in 1018 in FIG. 10A. The rationale for this is that the recommended maximum number of line items per page is 20 should not require that users proceed through two or more pages to see the entire list of genres. In some embodiments, the artist page comprises 5 genres or more, 10 genres or more, 15 genres or more, 20 genres or more, 30 genres or more, and 50 genres or more.

At the front page or any other page in artist module 706, a user can choose to go back to a previous page via the back option (e.g., 630 in FIG. 10C) or to return to the top menu page via menu option 640 in FIG. 10C. In addition, at least in some embodiments, at least one page in artist module 706 has a scroll bar 830 (FIG. 10B) which is used to navigate the content listed on the page.

Concerts. In some embodiments, concerts module 708 of FIG. 7 draws information from the Celebrity Access XML feed. In some embodiments, concert module 708 comprises instructions for identifying the music related event as a function of user directed input that includes a designated venue, artist, and/or zip code. The front page of concert module 708 is shown as page 1102 in FIG. 11A where a title 1100 is depicted over a background 1101. Background 1101 comprises a color and a pattern. In some embodiments, the color and pattern defined in background 1101 is unique to concert module 708. From front page 1102, a user may choose to list all local events, e.g., by selecting 1116 in FIG. 11A. In some embodiments, local events are selected for listing in accordance with a zip code information previously entered by a user during the initial registration process (e.g., 624 in FIG. 6B). For example, after option 1116 (FIG. 11A) is selected, one or more of the major acts and events occurring in the local area are listed (e.g., 1106 in FIG. 11C). A subheader 1130 shows the location of the local events. A user may further access a specific local event by selecting an event from the list of local events (e.g., 1132 in FIG. 11C).

Figures 11A, 11B:
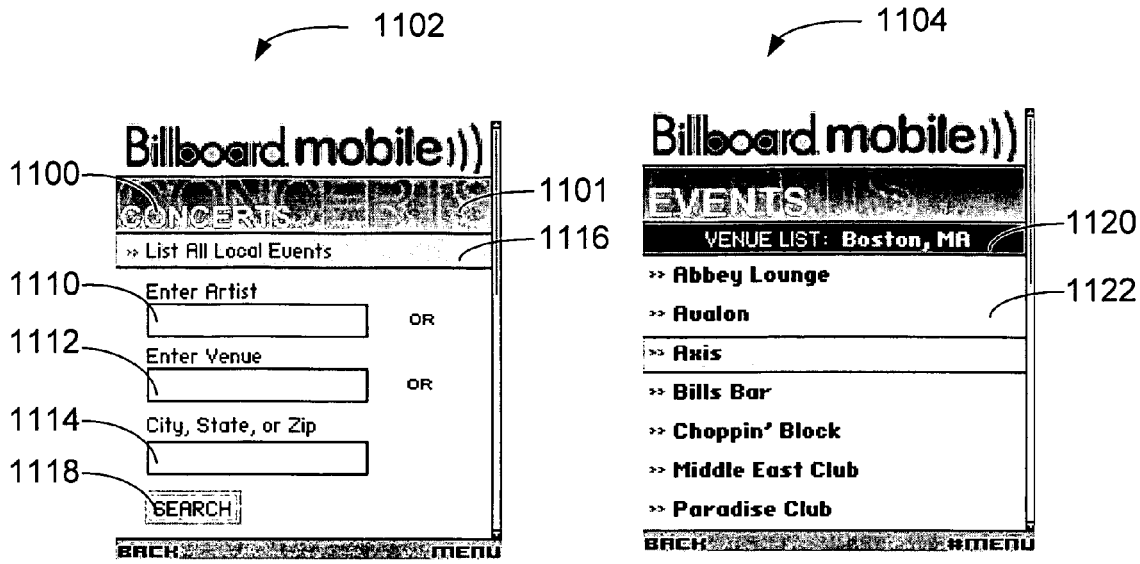
FIG. 11A illustrates an exemplary front page of a concert module in accordance with one embodiment of the present invention.
FIG. 11B illustrates an exemplary list of venues in a specific geographic area in accordance with one embodiment of the present invention.

Alternatively, a user may choose to list events by using one or more of the search functions in FIG. 11A. A user may enter the name of an artist or a group of artist in 1110 to search for events related to a particular artist or group of artists. A user may also choose to enter the name of a venue (e.g., 1112 in FIG. 11A) to list events occurring in the selected venue choice. In some embodiments, the designated venue is a city, town, village, county, building, and/or state. A user may choose to enter a city, a state, a zip code, or GPS coordinates, to list events occurring within a predetermined geographical region such as a city, state, or zip code (e.g., 1114 in FIG. 11A). For example, panel 1104 (FIG. 11B) depicts a list of venues in a certain geographic area (e.g., a list of venues in Boston, Mass. are shown in 1120 in FIG. 11B). A user may further identify local events in a particular venue by selecting the venue from the list of venues 1122.

The definition of the local area will be based on a radius from a user's zip code. The radius size will be variable depending on the population densities in and around a user's zip code. For example, large urban areas like Los Angeles, New York and Chicago will have a small radius. Smaller markets such as Cleveland, Pittsburgh, Little Rock and Buffalo and will have a larger radius. In some embodiments, information on local events are updated daily.

Figure 11C:
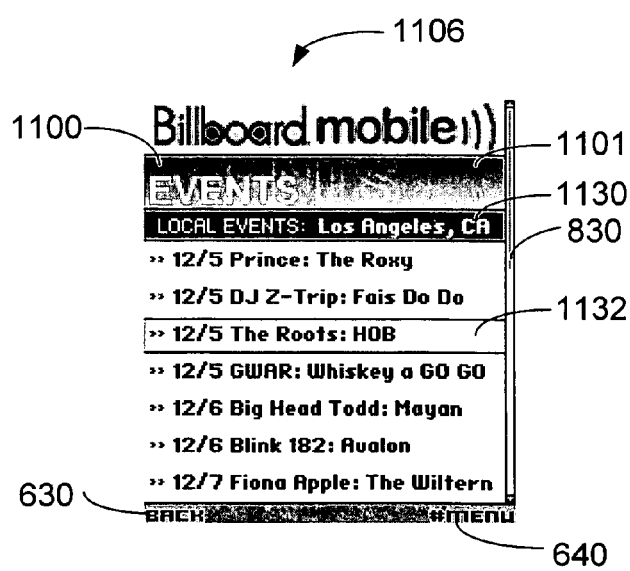
FIG. 11C illustrates a list of local events in accordance with one embodiment of the present invention.

At the front page or any other page in concert module 708, a user can choose to go back to a previous page via the back option (e.g., 630 in FIG. 11C) or to return to the top menu page via the menu option (e.g., 640 in FIG. 11C). In addition, at least in some embodiments and one at least one page in Concert module 708, a scroll bar (e.g., 830 in FIG. 11A) is used to navigate the content listed on the page.

Figure 12:
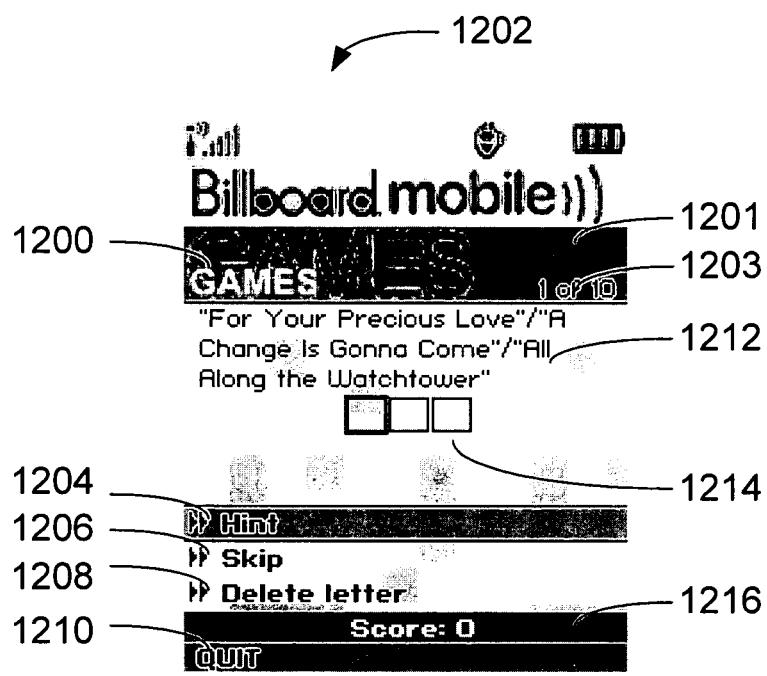
FIG. 12 illustrates a front page of a game module in accordance with an embodiment of the present invention.

Games. The Billboard Trivia application, also known as the game/music quiz module or game module 710 in FIG. 7, is based on content from the on-line Billboard crossword puzzle. The trivia application will automatically update weekly by the appropriate product. A front page of game/music quiz module 710 is shown as panel 1202 in FIG. 12. Game/music quiz module 710 presents the user with up to 60 trivia questions that are based on the Billboard Crossword puzzle. The front page includes a title 1200 on a background 1201. Background 1201 comprises a pattern and a color. In some embodiments, the pattern and color defined by background 1201 is unique to game module 710. The front page of game module 710 also comprises an index (e.g., 1203 in FIG. 12), and a question to the trivia Game (e.g., 1212 in FIG. 12), as well as a set of blank boxes (e.g., 1214 in FIG. 12) where a user may enter his or her answers corresponding to the question provided.

In some embodiments, the answer to a clue in game module 710 may include letter or number or a combination thereof. A user may use the scroll key and the phone keypad to enter the letters or numbers in answer box 1214 at the location they deem appropriate. A user has the choice of submitting the answer enter through an option not illustrated in FIG. 12, requesting that the application provide a hint to the trivia game (e.g., 1204 in FIG. 12), or skipping the current trivia question to select a different question (e.g., 1206 in FIG. 12). In some embodiments, a user may choose to correct an answer (e.g., 1208 in FIG. 12) before submitting the answer for a score (e.g., 1216 in FIG. 12). Correct answers will be acknowledged and the user will be invited to proceed to the next trivia question. The user will also be told their score for each question answered. Incorrect answers will be identified and the user will be given the option of getting the answer or to retry the current trivia question. In some embodiments, at any time in the trivia game the user can press hint key 1204 and the application will fill in one of the blanks in 1214. In some embodiments, using the hint option will reduce the score that will be provided to the user upon submission of the answer. In some embodiments, a perfect score, where the user gets the correct answer with no assistance from the application, will be equal to the number of letters in the word. In some embodiments, a total score for a user will be presented after the completion of all trivia questions. In some embodiments, a partial score for a user will be presented after partial completion of the trivia questions. In some embodiments, the final score is normalized and presented as a percentage such that scores for different users may be ranked. In some embodiments, all questions and answers used in game module 710 are updated on a periodic basis (e.g., hourly, daily, weekly, monthly, etc.) or on a nonperiodic basis. At any time when executing game module 710, a user may choose to leave game module 710 by choosing quit option 1210.

Figure 6B:
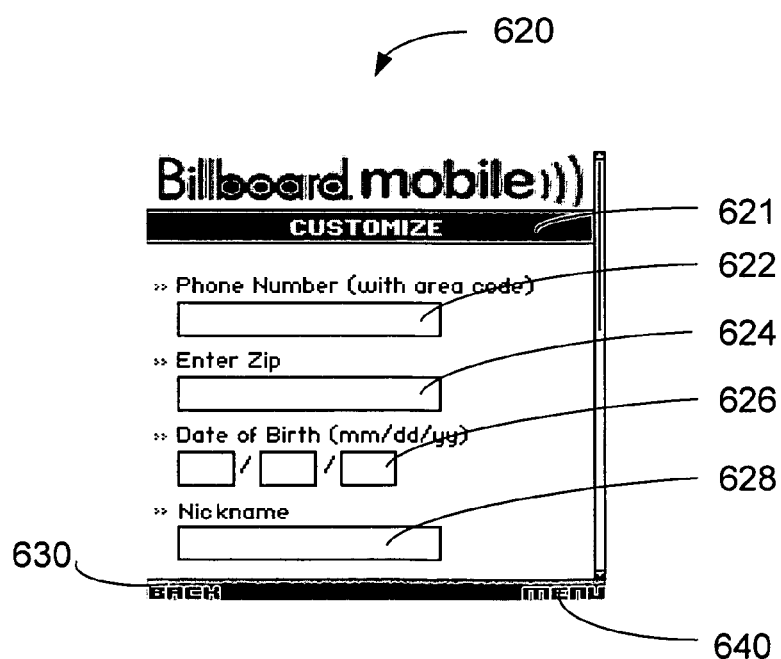
FIG. 6B illustrates a registration screen used by a program run on a mobile device in accordance with one embodiment of the present invention.

My Billboard. Under My Billboard module 712 of FIG. 7, users can manage their experience by modifying location, phone number and alerts. A top page, shown as 1302 in FIG. 13A, allows users to view and edit their preferences for an application (e.g., Billboard Mobile Channel). In some embodiments, My Billboard module 712 at 1302 is not a global control panel. For example, the signup for charts and artist alerts may be done at the individual Billboard Chart or Artist Pages as illustrated in FIG. 6B. At the top page, a title for My Billboard module 712 (e.g., 1300 in FIG. 13A) is depicted on a background 1301. In some embodiments, background 1301 comprises a pattern and a color. In some embodiments, the pattern and color defined by background 1301 are unique to My Billboard module 712.

In some embodiments, SMS, PSMS, EMS, MMS, instant messages, e-mail messages, and/or other types of electronic messages are used to alert a user of the availability of any music item that the user has previously defined as of interest. In some embodiments in accordance with the present invention, a user may choose to view and configure their message delivery preferences 1310 (FIG. 13A), to define a time of day for delivery of such messages and/or to turn on or off the message delivery (e.g., 1304 in FIG. 13B). A user may add or edit alerts using option 1314 in FIG. 13A. All current alerts that the subscriber has signed up for can be listed thereby allowing a user to delete or modify each alert independently. An exemplary page 1306 (FIG. 13C) depicts a list of alerts 1332 a user may include to individualize notifications page 1330. A mechanism (or procedure) is provided in some embodiments to ensure that the message (e.g. SMS) numbers used by the application are indeed those of the registered end user. In other embodiments, such alert messages are communicated to a mobile device 12 through other message protocols such as PSMS, EMS, MMS, instant messages, e-mail messages, and/or other types of electronic messages.

In some embodiments, a user may select page 1308 (FIG. 13D) by selecting option 1312 (FIG. 13A) in order to view and edit their location information such as zip code 624, phone number 622, and additional personal information including date of birth 626 and nickname 628. In some embodiments, a user may select option 1316 of panel 1302 in order to view and cancel their subscription to a registered program or application (e.g., Billboard Mobile Channel).

5.5.2 Registered Applications

In some embodiments, a music item is received by a mobile device 12 as a registered application. In the registered application embodiments, a set of high-level computer instructions that would typically be implemented using a standard application framework and class library are implemented using a modified application framework and classes that allow application provisioning server 100 to provide licensing and application management services. An application modified in this way is herein referred to as a registered application. At a high level, a registered application may be a non-native application that can be downloaded to and permanently stored on a mobile device (e.g., music module 380 in FIG. 3). Alternatively, at a lower level, a registered application may be a music item that can be downloaded to and permanently stored on a mobile device 12.

For example, a registered application can be implemented in a J2ME environment (e.g., FIG. 4A), where the top-level application is called a MIDlet. MIDlets are analogous to Applets used in web browsers, and are named after the Mobile Information Device Profile (MIDP) (e.g., 520 in FIG. 5). The MIDlet is the root of all MIDP applications and can be started, paused and stopped by the Java Application Manager on the device. The typical application "skeleton" or class shell for a standard MIDlet includes a StartApp( ) method that corresponds with a hierarchy of MIDlet-related class files. In some embodiments based on a J2ME environment, the standard MIDlet shell is updated so that a RegisteredStart( ) method and corresponding MIDlet-related class library files replace the standard StartApp( ) method and corresponding RegisteredMIDlet-related class library files.

This modified design allows an application provisioning server 100 to take control and perform tasks such as license verification, digital rights management, etc. before passing control back to the registered application running on a device. The registered application framework can be used to support developers across a range of available mobile devices 12 and can insulate developers from various carrier or service provider requirements.

By passing control to the application provisioning server 100, in some embodiments, the registered application (e.g., a music item such as a ringtone) can be used to prevent unwanted copying of the application from device to device. For example, a license key can be downloaded onto a mobile device 12 on which the registered application is initially installed. When the registered application is first run from the mobile device 12, application provisioning server 100 can then verify the license key.

The use of the registered application in this way prevents a copy from being executed without the license key because the license key is configured so that it is not copied when the application is copied from one device to another.

The registered application may support a variety of licensing arrangements. For example, a software application license can be tagged with an expiration date or a limited number of uses. In addition, many variations of server-based charging policies may be applied, including rental, rental subscription, limited free trial, coin-op, feature charging, etc. With many of these charging models, if an application user's license expires, the application may refer back to the license server for a new license, at which point a further charge to the user's account can be made, subject to the user's approval.

Besides facilitating licensing and prevention of copying, the registered application may facilitate the generation and monitoring of other types of billing events associated with a user's account (e.g., "feature charging", customer support tools 336-5 in FIG. 4A). For example, a user may be charged for "cheat codes" or "hints" associated with an electronic game. In addition, the registered application may allow for sending user data such as high scores to the provisioning server and, optionally, to charge for such services according to a policy set by the provisioning server. For example, a user of a game application may be able to post his/her high score to a central leader board seen by all other players—either downloaded back onto the mobile device or viewable from the mobile device's WAP browser or a web browser.

Web retail models have demonstrated the value of incorporating user feedback into a catalog used to display lists of applications available to users. In some embodiments, the registered application allows the user to provide such feedback. For example, a user may rate an application after it is purchased. This rating may be posted to a server and used to generate popularity statistics. Applications can then be presented in application catalog menus in order of popularity, increasing the likelihood of user satisfaction with a download, as user ratings are a more precise measure than the number of downloads.

The registered application may also provide various services to developers. For example, developers may initially design applications using a single scaled-down version of the registered application, creating a general version of the registered application. Later, the facility can substitute a specific version of the registered application appropriate for a specific user's particular mobile device and/or service without having to involve the developer in this stage.

Additionally, the registered application may allow for easy upgrades of already-installed registered applications, allowing application developers to continue to improve their applications, even after they have been distributed in the consumer market. A server may keep track of which versions of registered applications individual users have downloaded allowing updates to be deployed to them. Registered applications may automatically check for updates. Many options are available for billing or charging users for updates. For example, updates that fix problems may be made freely available while new improved versions might incur an upgrade fee.

As well as eliminating a cycle of updates with developers, the registered application may also provide some other standardization such as elements of the application's user interface (e.g., how to present error states or game intro sequences).

Once a non-native application is developed using the registered application framework, the application may be prepared for download. In some embodiments, a provisioning server prepares and processes the application. The registered application is bound within an application package prior to download. The application package may contain, for example, Joint Application Development (JAD) and JAR files, along with a brochure, screenshots, and other information about the application (e.g., target mobile device, language, version, etc.).

In the case where the developer/programmer uses a scaled-down version of the registered application during development, binding the registered application in a JAR file may involve packaging the application with a more robust version of the registered application that corresponds to, for example, a carrier's infrastructure (e.g., which application provisioning server 100 and digital rights management the carrier is using). In the case of an MIDP application (as depicted in FIG. 4A), this may involve replacing the registered MIDlet class file in the application JAR. In addition, a unique version of the registered application may be available for each of the mobile devices 12 being supported by a particular carrier. In this way, the application package may be deployed with the correct registered application without the distributor having to go through a cycle with the developer. In some embodiments, the application provisioning server 100 could bind the correct registered application with the JAR file "on the fly."

5.6 Ringtones as Music Items

In some embodiments in accordance with the present invention, the music item communicated from provisioning server 100 to mobile devices 12 is a ringtone. Exemplary ringtones include, but are not limited to, monophonic ringtones, polyphonic ringtones, music ringtones, RTTTL or Nokring formatted ringtones, to name a few.

Monophonic Ringtones. Early mobile devices 12 had the ability to play only monophonic ringtones, short tunes played with simple tones. These early phones also had the ability to have ringtones programmed into them using an internal ringtone composer. Various formats were developed to enable ringtones to be sent via SMS text, for example RTTTL encoding.

Polyphonic Ringtones. Polyphonic means that multiple notes can be played at the same time using instrument sounds such as guitar, drums, electronic piano, etc. Many mobile devices 12 are now able to play more complex polytones. For example, some mobile devices 12 can play up to 128 individual notes using different instruments that are played simultaneously in order to give a more realistic musical sound. Polyphonic ringtones are based upon midi sequences that can pool in more than 100 different midi sounds. Many polyphonic capable mobile devices 12 are able to play standard midi files, others play sp-midi which is scalable polyphony and depending on the number of channels the phone can play the handset will render that many notes. Many mobile devices 12 support SMAF (.mmf) files which are based upon a sound format devised by Yamaha.

Music ringtones. A new version of ringtones, often called either music ringtones, voice tones, mastertones, realtones, singtones or true tones, now use actual pieces of music, along with all lyrics and the entire song backing music, including backing singers. They are usually contained in AAC, MP3, WMA, WAV, QCP, or AMR format that can be used as a ringtone on many mobile devices 12. Many mobile device 12 manufacturers include voice ringtones on most of their newly released phones, including Motorola, Nokia and Sony Ericsson. Mobile devices 12 from different manufactures may be designed to use different ringtone formats. For example, there are at least three types of ringtone text formats for Nokia mobile devices 12.

RTTTL or Nokring format. The RTTTL format is used by programs such as Nokring or LogoManager to upload ringtones to mobile devices 12 via SMS. An example of RTTTL format is: SongTitle d=4,o=6,b=63:c,d,e,16p,8a#.7.

6. Additional Embodiments

The present invention provides systems and methods for providing entertainment related services on mobile devices. In one embodiment a menu in a program permanently stored on a mobile device, such as a cell phone or personal digital assistant, is executed. Then a first module from the menu is selected thereby providing access to a catalog of music items. The user makes a selection of a music item from the catalog. The music item is then retrieved from a remote server. In some embodiments, the menu comprises a plurality of modules where at least one module in the plurality of modules provides a link to ranked music indicia.

In some embodiments in accordance with the present invention, the communication method further comprises an additional step of obtaining a message that is communicated by a short message service (SMS) communication, an enhanced messaging system (EMS) communication, or a multi-media messaging service (MMS) communication. In some embodiments, the purpose of this message is to provide details of the transaction including, for example, the amount charge to an account for downloading a particular music item.

In some embodiments, the catalog of music items comprises a plurality of ringtones, a plurality of songs, or any combination thereof. In some embodiments, the music item is permanently stored on a mobile device whereas in other embodiments the music item is not permanently stored on a mobile device.

In some embodiments, a module in the plurality of modules provides ranked music indicia. Examples of ranked music indicia include but are not limited to ranked lists of songs, albums, and ringtones. In some embodiments, the module that provides ranked music indicia comprises instructions for providing ranked music indicia as a function of user directed input that includes an artist, band, orchestra, or genre.

In some embodiments, a module in the plurality of modules provides music related news and reviews. In some embodiments, such music related news and reviews is provided as a function of user directed input. Example of user directed input includes, but is not limited to, a designated venue, artist, band, orchestra, genre, zip code, city, town, village, group of artists, or album. As such, in some embodiments, the news and reviews concerns a venue, artist, band, orchestra, genre, zip code, group of artists, or album.

In some embodiments, a module in the plurality of modules provides information about an artist, band, or musical genre. In some embodiments, such information comprises the discography of an artist or band and/or news or a review of the artist or band. In some embodiments, the information provided further comprises the biography of an artist or band and/or the ranked ringtone list of the artist or band. In some embodiments, the module that provides information about an artist or band comprises instructions for providing information about an artist or band as a function of user directed input that includes a name of an artist, band, orchestra, or musical genre.

In some embodiments, a module in the plurality of modules provides information about a music event, for example, a concert. In some embodiments, the music event is a concert performed by an artist or band. In some embodiments, the music event takes place in a designated venue, for example, a city, town, village, county, building, or state. In some embodiments, the module comprises instructions for identifying the music event as a function of user directed input that includes a designated venue, artist, city, town, state, street address, telephone number, or zip code. In some embodiments, a module in the plurality of modules provides access to a game, for example, a music-related trivia game. In some embodiments, a score of the game is retrieved from the mobile device and ranked by a remote server.

In some embodiments, a module in the plurality of modules provides a platform to create a user profile that individualizes communication and services. In an exemplary embodiment, a user profile comprises a setting for message delivery or a notification of a ringtone.

In some embodiments, the menu in the communication program is executed in a J2ME environment. In some embodiments, the execution of the communication program requires a verification process such as the exchange of a license code or password between an application provisioning server and the mobile device prior to execution of the menu. In some embodiments, the program is downloaded to the mobile device through a wireless communication with an application provisioning server. In some embodiments, the program comprises a MIDlet. In some embodiments, the communication program is configured to receive updates from the application provisioning server. In some embodiments, the catalog of music items is stored on the application provisioning server.

7. References Cited

The present invention can be implemented as a computer program product that comprises a computer program mechanism embedded in a computer readable storage medium. For instance, the computer program product could contain the program modules shown in FIG. 1 and/or FIG. 3. These program modules can be stored on a CD-ROM, DVD, magnetic disk storage product, or any other computer readable data or program storage product. The program modules can also be embedded in permanent storage, such as ROM, one or more programmable chip, or one or more application specific integrated circuits (ASICs). Such permanent storage can be localized in a server, 802.11 access point, 802.11 wireless bridge/station, repeater, router, mobile phone, or other electronic devices. The software modules in the computer program product can also be distributed electronically, via the Internet or otherwise, by transmission of a computer data signal (in which the software modules are embedded) either digitally or on a carrier wave.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed:

1. A computer program product for use in conjunction with a mobile device, the computer program product comprising a computer readable non-transitory storage medium and a computer program mechanism embedded therein, the computer program mechanism comprising:

instructions for executing a menu comprising:

a ranked music indicia option that provides an option to select a ranked list of music indicia from among a plurality of ranked lists of music indicia thereby enabling review of the ranked list of music indicia over a cellular network, wherein exercising the option to select the ranked list of music indicia from among the plurality of ranked lists of music indicia leads to a more detailed ranked list of music indicia, the more detailed ranked list of music indicia providing the option to select music items, wherein selection of a music item in the more detailed ranked list the more detailed ranked list of music indicia provides a link to a module, the module providing (i) a title of the selected music item, (ii) a performing artist or group of artists associated with the music item, (iii) a record year of the music item, (iv) a photo of the artist or group of artists associated with the music item, (v) a link where a user may purchase the selected music item, and (vi) an option of previewing the selected music item that further provides a user the option of adjusting the volume of and replaying the selected music item, wherein the music item may be permanently stored on a mobile device by downloading it over the cellular network upon purchasing the selected music item, the ranked music indicia option further including a navigation scroll to navigate the ranked list of music indicia;

a reviews option for reviews relating to a music artist or a band over a cellular network; and an artist option to obtain information about a music artist or a band over a cellular network;

wherein the computer program mechanism further comprises instructions for executing a verification process that validates a user, without human intervention, prior to executing said menu.

2. The computer program product of claim 1, wherein the ranked music indicia option, the reviews option, and the artist option each directly link or indirectly link to a music store over a cellular network where a music item can be purchased.

3. The computer program product of claim 2, wherein the computer program mechanism further comprises instructions for obtaining a message over a cellular network when the music item is purchased.

4. The computer program product of claim 3, wherein the message is a short message service (SMS) communication, an enhanced messaging system (EMS) communication, a multimedia messaging service (MMS) communication, an instant message, or an e-mail.

5. The computer program product of claim 2, wherein the message conveys a charge for the music item when the music item is permanently stored in said mobile device.

6. The computer program product of claim 1, wherein the computer program mechanism further comprises instructions for:

(i) permanently storing a music item received over a cellular network in said mobile device, or (ii) sampling a music item received over a cellular network without permanent storage in said mobile device.

7. The computer program product of claim 1, wherein the mobile device is a cell phone or personal digital assistant.

8. The computer program product of claim 1, wherein the cellular network used by the ranked music indicia option, the reviews option, or the artist option implements a 2G protocol.

9. The computer program product of claim 1, wherein the cellular network used by the ranked music indicia option, the reviews option, or the artist option implements a 2G protocol.

10. The computer program product of claim 1, wherein the ranked list of music indicia in the plurality of ranked list of music indicia comprises a ranked list of songs, a ranked list of albums, or a ranked list of ringtones.

11. The computer program product of claim 1, wherein the reviews option comprises instructions for providing music related reviews as a function of user directed input that includes a designated venue, an artist, a band, an orchestra, a genre, a zip code, a band, or an album identity.

12. The computer program product of claim 1, wherein the reviews concern a venue, an artist, a band, an orchestra, a genre, a zip code, or an album.

13. The computer program product of claim 1, wherein the information about an artist or a band comprises the discography of the artist or band.

14. The computer program product of claim 1, wherein the information about an artist or a band comprises a review of the artist or band.

15. The computer program product of claim 1, wherein the information about an artist or a band comprises a biography of the artist or the band.

16. The computer program product of claim 1, wherein the information about an artist or a band comprises a ranked ringtone list of the artist or the band.

17. The computer program product of claim 1, wherein the artist option comprises instructions for providing information about an artist or a band as a function of user directed input that includes an artist, a band, an orchestra, or a genre.

18. The computer program product of claim 1, wherein the menu further comprises:

a music related events option to obtain information about a plurality of music related events in a geographical area.

19. The computer program product of claim 18, wherein the music related event is a concert performed by an artist or a band.

20. The computer program product of claim 18, wherein a music related event in said plurality of music related events takes place in a designated venue.

21. The computer program product of claim 20, wherein the designated venue is a city, town, village, county, building, or state.

22. The computer program product of claim 18, wherein the music related events option comprises instructions for identifying the music related event as a function of user directed input that includes a designated venue, an artist, or a zip code.

23. The computer program product of claim 1, wherein the menu further comprises:

a games option that provides access to a game over a cellular network.

24. The computer program product of claim 23, wherein the game is a music-related trivia game.

25. The computer program product of claim 1, wherein the menu further comprises:

a personalization option that facilitates creation of a user profile that individualizes a plurality of user specified preferences.

26. The computer program product of claim 25, wherein a user specified preference in said plurality of user specified preferences is a setting for message delivery.

27. The computer program product of claim 25, wherein a user specified preference in said plurality of user specified preferences is a default ringtone specification.

28. The computer program product of claim 1, wherein said verification process comprises communicating a license code or password over a cellular network.

29. The computer program product of claim 1, wherein the ranked list of music indicia in the plurality of ranked list of music indicia comprises Ringtone Top 20, R&B/HipHop Top 20, Rock Top 20, Pop Top 20, Latin Top 20, Country Top 20, or Rap Top 20.

30. The computer program product of claim 1, wherein the ranked music indicia in the plurality of ranked list of music indicia comprises ringtones ranked by a number of downloads in a predetermined time period.

31. The computer program product of claim 30, wherein the predetermined time period is a minute, an hour, a day, a week, a month, or a year.

32. An application provisioning server comprising:
a central processing unit; and
a memory, coupled to the central processing unit, the memory comprising instructions for
(i) receiving from a dedicated music application on a remote device a selection over a cellular network from a menu executed on the remote device, the menu comprising:
a ranked music indicia option that provides an option to select a ranked list of music indicia from among a plurality of ranked lists of music indicia thereby enabling review of the ranked list of music indicia over a cellular network, wherein exercising the option to select the ranked list of music indicia from among the plurality of ranked lists of music indicia leads to a more detailed ranked list of music indicia, the more detailed ranked list of music indicia providing the option to select music items, wherein selection of a music item in the more detailed ranked list the more detailed ranked list of music indicia provides a link to a module, the module providing (i) a title of the selected music item, (ii) a performing artist or group of artists associated with the music item, (iii) a record year of the music item, (iv) a photo of the artist or group of artists associated with the music item, (v) a link where a user may purchase the selected music item, and (vi) an option of previewing the selected music item that further provides a user the option of adjusting the volume of and replaying the selected music item, wherein the music item may be permanently stored on a mobile device by downloading it over the cellular network upon purchasing the selected music item, the ranked music indicia option further including a navigation scroll to navigate the ranked list of music indicia;
a reviews option for reviews relating to a music artist or a band over a cellular network; and
an artist option to obtain information about a music artist or a band over a cellular network;
(ii) providing over a cellular network to the dedicated music application on the remote device, as a function of said selection, any of:
a selected ranked list of music indicia;
reviews relating to a music artist or band; or
information about a music artist or a band; and
(iii) executing a verification process that validates a user, without human intervention, prior to executing said providing (ii).

33. The application provisioning server of claim 32, wherein the selected ranked list of music indicia comprises a ranked list of songs, albums, or ringtones.

34. The application provisioning server of claim 32, wherein the selected ranked list of music indicia comprises Ringtone Top 20, R&B/HipHop Top 20, Rock Top 20, Pop Top 20, Latin Top 20, Country Top 20, or Rap Top 20.

35. The application provisioning server of claim 32, wherein the selected ranked music indicia comprises ringtones ranked by a number of downloads in a predetermined time period.

36. The application provisioning server of claim 35, wherein the predetermined time period is a minute, an hour, a day, a week, a month, or a year.

37. A computer program product for use in conjunction with a computer, the computer program product comprising a computer readable non-transitory storage medium and a computer program mechanism embedded therein, the computer program mechanism comprising instructions for:
(i) receiving from a music dedicated application on the remote device a menu selection over a cellular network from a menu executed on the remote device, the menu comprising:
a ranked music indicia option that provides an option to select a ranked list of music indicia from among a plurality of ranked lists of music indicia thereby enabling review of the ranked list of music indicia over a cellular network, wherein exercising the option to select the ranked list of music indicia from among the plurality of ranked lists of music indicia leads to a more detailed ranked list of music indicia, the more detailed ranked list of music indicia providing the option to select music items, wherein selection of a music item in the more detailed ranked list the more detailed ranked list of music indicia provides a link to a module, the module providing (i) a title of the selected music item, (ii) a performing artist or group of artists associated with the music item, (iii) a record year of the music item, (iv) a photo of the artist or group of artists associated with the music item, (v) a link where a user may purchase the selected music item, and (vi) an option of previewing the selected music item that further provides a user the option of adjusting the volume of and replaying the selected music item, wherein the music item may be permanently stored on a mobile device by downloading it over the cellular network upon purchasing the selected music item, the ranked music indicia option further including a navigation scroll to navigate the ranked list of music indicia;
a reviews option for reviews relating to a music artist or a band over a cellular network; and
an artist option to obtain information about a music artist or a band over a cellular network;
(ii) providing over a cellular network to the dedicated music application on the remote device, as a function of said menu selection, any of:
a selected ranked list of music indicia;
news and reviews relating to a music artist or band; or
information about a music artist or a band; and
(iii) executing a verification process that validates a user, without human intervention, prior to executing said providing (ii).

38. The computer program product of claim 37, wherein the ranked list of music indicia comprises a ranked list of songs, albums, or ringtones.

39. The computer program product of claim 37, wherein the ranked list of music indicia comprises Ringtone Top 20, R&B/HipHop Top 20, Rock Top 20, Pop Top 20, Latin Top 20, Country Top 20, or Rap Top 20.

40. The computer program product of claim 37, wherein the ranked music indicia comprises ringtones ranked by a number of downloads in a predetermined time period.

41. The computer program product of claim 40, wherein the predetermined time period is a minute, an hour, a day, a week, a month, or a year.

42. The computer program product of claim 2, wherein the music item is a full track song or a ring tone.

43. A mobile device comprising:
  instructions for executing a menu comprising:
    a ranked music indicia option that provides an option to select a ranked list of music indicia from among a plurality of ranked lists of music indicia thereby enabling review of the ranked list of music indicia over a cellular network, wherein exercising the option to select the ranked list of music indicia from among the plurality of ranked lists of music indicia leads to a more detailed ranked list of music indicia, the more detailed ranked list of music indicia providing the option to select music items, wherein selection of a music item in the more detailed ranked list the more detailed ranked list of music indicia provides a link to a module, the module providing (i) a title of the selected music item, (ii) a performing artist or group of artists associated with the music item, (iii) a record year of the music item, (iv) a photo of the artist or group of artists associated with the music item, (v) a link where a user may purchase the selected music item, and (vi) an option of previewing the selected music item that further provides a user the option of adjusting the volume of and replaying the selected music item, wherein the music item may be permanently stored on a mobile device by downloading it over the cellular network upon purchasing the selected music item, the ranked music indicia option further including a navigation scroll to navigate the ranked list of music indicia;
    a reviews option for reviews relating to a music artist or a band over a cellular network; and
    an artist option to obtain information about a music artist or a band over a cellular network; wherein
  the computer program mechanism further comprises instructions for executing a verification process that validates a user, without human intervention, prior to executing said menu.

* * * * *